(12) United States Patent
Jelliss et al.

(10) Patent No.: US 9,745,190 B2
(45) Date of Patent: Aug. 29, 2017

(54) PASSIVATED METAL NANOPARTICLES HAVING AN EPOXIDE-BASED OLIGOMER COATING

(75) Inventors: Paul Jelliss, St. Louis, MO (US); Steven Buckner, St. Louis, MO (US); Stephen W. Chung, St. Louis, MO (US); Brandon J. Thomas, St. Louis, MO (US)

(73) Assignee: Saint Louis University, St. Louis, MO (US)

( * ) Notice: Subject to any disclaimer, the term of this patent is extended or adjusted under 35 U.S.C. 154(b) by 799 days.

(21) Appl. No.: 13/178,398

(22) Filed: Jul. 7, 2011

(65) Prior Publication Data

US 2012/0009424 A1    Jan. 12, 2012

Related U.S. Application Data

(60) Provisional application No. 61/362,185, filed on Jul. 7, 2010.

(51) Int. Cl.
| | |
|---|---|
| *B32B 5/16* | (2006.01) |
| *B82Y 30/00* | (2011.01) |
| *B82Y 40/00* | (2011.01) |
| *B01J 13/14* | (2006.01) |
| *B22F 1/00* | (2006.01) |
| *C07F 19/00* | (2006.01) |
| *C08F 130/04* | (2006.01) |
| *B82B 1/00* | (2006.01) |
| *B82B 3/00* | (2006.01) |

(52) U.S. Cl.
CPC ............... *B82Y 30/00* (2013.01); *B01J 13/14* (2013.01); *B22F 1/0018* (2013.01); *B22F 1/0062* (2013.01); *B82Y 40/00* (2013.01); *B22F 2999/00* (2013.01); *Y10T 428/2991* (2015.01)

(58) Field of Classification Search
None
See application file for complete search history.

(56) References Cited

U.S. PATENT DOCUMENTS

| | | | | |
|---|---|---|---|---|
| 5,256,804 A | * | 10/1993 | Ampleman | ............... 552/10 |
| 5,885,321 A | | 3/1999 | Higa et al. | ............... 75/362 |
| 6,444,318 B1 | * | 9/2002 | Guire et al. | ............... 428/412 |
| 2003/0224152 A1 | | 12/2003 | Yokoyama et al. | ......... 428/209 |
| 2005/0074551 A1 | | 4/2005 | Huang et al. | ............... 427/212 |
| 2007/0272112 A1 | | 11/2007 | Nielson et al. | ............... 102/473 |
| 2008/0020317 A1 | | 1/2008 | Park et al. | ............... 430/138 |

(Continued)

FOREIGN PATENT DOCUMENTS

| | | |
|---|---|---|
| GB | 2248853 | 4/1992 |
| WO | WO 2011/142956 | 11/2011 |

OTHER PUBLICATIONS

Aumann et al., "Oxidation behavior of aluminum nanopowders," *J. Vac. Sci Technol. B*, 13(3):1178-1183, 1995.

(Continued)

*Primary Examiner* — Ronak Patel
*Assistant Examiner* — Thomas Mangohig
(74) *Attorney, Agent, or Firm* — Parker Highlander PLLC

(57) ABSTRACT

This invention provides metal nanoparticles (e.g., aluminum, chromium, iron and magnesium) having an epoxide-based oligomer coating, compositions thereof, method of making the same, and methods of use thereof, including for energy related applications.

33 Claims, 27 Drawing Sheets

(56) References Cited

U.S. PATENT DOCUMENTS

| | | | |
|---|---|---|---|
| 2008/0149176 A1 | 6/2008 | Sager et al. | |
| 2008/0234417 A1 | 9/2008 | Kruse et al. | 524/259 |
| 2011/0159291 A1* | 6/2011 | Sun et al. | 428/407 |
| 2012/0270050 A1* | 10/2012 | Anderson et al. | 428/402.24 |

OTHER PUBLICATIONS

Baldée al., "Facilitated hydrogen storage in NaAlH4 supported on carbon nanofibers," *Angew. Chem. Int. Ed.*, 45:3501-3503, 2006.

Ermoline et al., "Production of carbon-coated aluminium nanopowders in pulsed microarc discharge," *Nanotechnology*, 13:638-643, 2002.

Foley et al., "Inhibition of oxide formation on aluminum nanoparticles by transition metal coating," *Chem. Mater.*, 17:4086-4091, 2005.

Garcia et al., "New heterogeneous catalysis for the synthesis of poly(ether polyol)s," *J. Appl. Polym. Sci.*, 86:1553-1557, 2002.

Glotov and Zyryanov, "The effect of pressure on characteristics of condensed combustion products of aluminized solid propellant," *Archivum combustionis*, 11(3-4):251-262, 1991.

Haber and Buhro, "Kinetic instability of nanocrystalline aluminum prepared by chemical synthesis; facile room-temperature grain growth," *J. Am. Chem. Soc.*, 120:10847-10855, 1998.

International Search Report and Written Opinion issued in PCT/US2011/43243, Mar. 28, 2012.

Jelliss et al., "An integrated synthetic methodology for surface passivation and kinetic stabilization of aluminum nanoparticles with polymerizable capping agents," *Nanofrontiers Symposium, Missouri State University*, Springfield, MO, Oct. 2011.

Jouet et al., "Surface passivation of bare aluminum nanoparticles using perfluoroalkyl carboxylic acids," *Chem. Mater.*, 17:2987-2996, 2005.

Roy et al., "The dispersion and polymer coating of ultrafine aluminum powders by the Ziegler Natta reaction," *Mat. Res. Soc. Symp. Proc.*, 800:AA2.5, 2004.

Schilling and Tonelli, "Carbon-13 NMR determination of poly(propylene oxide) microstructure," *Macromolecules*, 19:1337-1343, 1986.

Tyagi et al., "Increased hot-plate ignition probability for nanoparticle-laden diesel fuel," *Nano Lett.*, 8(5):1410-1416, 2008.

Yang and Tsai., "Complexometric titration of aluminum and magnesium ions in commercial antacids. An experiment for general and analytical chemistry laboratories," *J. Chem. Educ.*, 83:906-909, 2006.

Chung et al., "Capping and passivation of aluminum nanoparticles using alkyl-substituted epoxides," *Langmuir*, 25(16):8883-8887, 2009.

Office Action issued in European Application No. 11831088.7, mailed Mar. 7, 2016.

Extended European Search Report issued in European Application No. 11831088.7, mailed Apr. 15, 2014.

Hammerstroem et al., "Aluminum nanoparticles capped by polymerization of alkyl-substituted epoxides: ratio-dependent stability and particle size," *Inorg. Chem.*, 50:5054-5059, 2011.

* cited by examiner

FIGS. 1a-d

PASSIVATED METAL NANOPARTICLES HAVING AN EPOXIDE-BASED OLIGOMER COATING

The present application claims priority to U.S. Provisional Application Ser. No. 61/362,185, filed Jul. 7, 2010, the entire content of which is incorporated herein by reference in its entirety.

This invention was made with government support under agreement numbers Subrecipient Agreement No. RSC10011, Prime Cooperative Agreement No. FA8650-10-2-2934, Subrecipient Agreement No. RSC07001, Prime Cooperative Agreement No. F33615-03-2-2347, and Prime Cooperative Agreement No. F33615-03-D-2329 awarded by the U.S. Air Force. The government has certain rights in the invention.

BACKGROUND OF THE INVENTION

I. Field of the Invention

The present disclosure relates generally to the fields of chemistry and materials science. More particularly, it concerns metal nanoparticles having an epoxide-based oligomer coating, compositions thereof, method of making the same, and methods of use thereof, including for energy related applications.

II. Description of Related Art

Aluminum nanostructures are valuable for many energy-related applications. These applications stem from aluminum's low atomic number, low density, high abundance, low cost, and its 3 electron reduction and high redox potential. Micron-sized aluminum particles have long been used in thermite reactions, as propellants for rockets, in magneto-hydrodynamic generators, and other applications. Aluminum's advantage over comparable organic solids as propellants is its high energy density. In addition to the long history of aluminum as a solid propellant, it has also recently been discussed as an additive to liquid fuels. Phelan and coworkers recently demonstrated that nanoscale aluminum increases the ignition probability of diesel fuels (Tyagi et al., 2008). Further, nano aluminum and alanates are being considered as hydrogen storage materials (Baldé et al., 2006.

While there are many applications for nanoscale aluminum materials there are challenges with producing air stable nanoscale aluminum structures with small diameters (<100 nm). Buhro demonstrated that unprotected aluminum nanostructures are kinetically unstable to grain growth (Haber and Buhro, 1998). Aluminum is also reactive with oxygen and water to produce $Al_2O_3$ to give a 2-6 nm thick oxide layer (Aumann et al., 1995). This layer passivates the underlying aluminum core, but it is a significant fraction of the mass of small nanostructures. For nanoparticles with diameters less than 20 nm the oxide layer can account for more than 70% of the particle mass. This oxide layer significantly lowers the nanoparticle's energy density, slows the nanoparticle combustion rate, may prevent complete aluminum consumption, and can reduce hydrogen absorption for storage applications. Accordingly, identifying and developing materials and compositions that overcome these limitations is desirable.

A number of passivation strategies have been reported for aluminum nanoparticles. For micron-sized particles, simple oxide passivation may be useful since an oxide coating of a few nanometers accounts for only a few percent or less of the total particle mass. For larger particles, alternatives to oxide passivation of aluminum that provide increased energy content include graphite (Ermoline et al., 2002), polymer (Roy et al., 2004), or transition metal coatings. For nanoscale particles, Jouet and coworkers (Jouet et al., 2005) reported nano-Al stabilization with carboxylic acid monolayer coatings while Foley and coworkers (Foley et al., 2005) reported effective transition metal capping of nano-aluminum. Additional metal coating and passivation techniques would be a great advantage.

SUMMARY OF THE INVENTION

In one aspect, there is provide a nanoparticle comprising:
a) a core comprising a metal; and
b) a coating surrounding the core, wherein the coating comprises an epoxide-based oligomer.

In some embodiments, the metal is Al, Cr, Mg or Fe. For example, the metal may be Al. In some embodiments, the epoxide-based oligomer comprises a repeat unit having the following structure prior to any cross-polymerization:

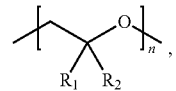

wherein:
n is 2 to 20; and
$R_1$ and $R_2$ are each independently H or $alkyl_{(C \leq 18)}$, $alkenyl_{(C \leq 18)}$, $alkynyl_{(C \leq 18)}$, $acyl_{(C \leq 18)}$, $aryl_{(C \leq 18)}$, $aralkyl_{(C \leq 18)}$, $heteroaryl_{(C \leq 18)}$, $alkoxy_{(C \leq 18)}$, $acyloxy_{(C \leq 18)}$, $alkylamino_{(C \leq 18)}$, $dialkylamino_{(C \leq 18)}$, $amido_{(C \leq 18)}$ or a substituted version of any of these groups.

In some embodiments, $R_1$ is H. In some embodiments, $R_2$ is $alkyl_{(C \leq 18)}$. In some embodiments, $R_2$ is n-butyl. In some embodiments, $R_2$ is n-decyl. In some embodiments, $R_2$ is $alkenyl_{(C \leq 18)}$. In some embodiments, $R_2$ is octa-7-en-1-yl.

In some embodiments, $R_1$ or $R_2$ of one oligomer chain is covalently attached (cross-polymerized) with $R_1$ or $R_2$ of another oligomer chain.

In some embodiments, the $R_2$ groups of one or more of the oligomers have been cross-polymerized to one another. In some embodiments, the cross-polymerization comprises an olefin polymerization reaction of the carbon-carbon double bonds of the $R_2$ groups. In some embodiments, the cross polymerization further comprises a co-polymerization of the double bonds of the $R_2$ groups with the double bonds of an $alkadiene_{(C4-30)}$, for example, 1,13 tetradecadiene.

In some of the above embodiments, the molar ratio of the aluminum of the core to the monomer of the epoxide-based oligomer is from about 0.5:1 to about 10:1 or from about 1:1 to about 5:1, about 1:1. In some of the above embodiments, the molar ratio of the aluminum to the monomer of the epoxide-based oligomer is about 2:1. In some embodiments, the molar ratio of the aluminum to the monomer of the epoxide-based oligomer is about 5:1.

In some of the above embodiments, the core is greater than 70% by weight aluminum, the core is greater than 80% by weight aluminum, the core is greater than 90% by weight aluminum, greater than 95% by weight aluminum, less than 10% by weight aluminum oxide, and/or less than 5% by weight aluminum oxide.

In some embodiments, the nanoparticle has an average diameter from about 10 nm to about 500 nm, from about 10 nm to about 300 nm, from about 10 to about 150 nm or from about 10 to about 40 nm, for example, about 19 nm or about 25 nm. In some of the above embodiments, the nanoparticle has a diameter of about 100 nm.

In another aspect of the invention, there is provide a method of making a nanoparticle comprising:
a) a core comprising aluminum; and
b) a coating surrounding the core, wherein the coating comprises an epoxide-based oligomer.

In some embodiments, the method comprise reacting an alane-amine complex with titanium isopropoxide and an epoxide monomer to form the nanoparticle. In some embodiments, the alane amine complex is N,N-dimethylethylamine alane. In some embodiments, the alane amine complex is dissolved in a first solvent prior to the reacting of the alane-amine complex with titanium isopropoxide and the epoxide monomer. In some embodiments, the first solvent comprises toluene. In some embodiments, the first solvent comprises diethyl ether. In some embodiments, the titanium isopropoxide is dissolved in a second solvent prior to the reacting of the alane-amine complex with titanium isopropoxide and the epoxide monomer. In some embodiments, the second solvent comprises toluene. In some embodiments, the reacting of the alane-amine complex with titanium isopropoxide and the epoxide monomer occurs at approximately 300K and over approximately from about 10 to about 60 minutes. In some embodiments, the reacting of the alane-amine complex with titanium isopropoxide and the epoxide monomer occurs at from about 300K to about 450K. In some embodiments, the method further comprises removing the solvent after the reacting of the alane-amine complex with titanium isopropoxide and the epoxide monomer. In some embodiments, the method further comprises crosspolymerizing two or more $R_1$ or $R_2$ groups so that one oligomer chain is covalently attached with $R_1$ or $R_2$ of another oligomer chain's $R_1$ or $R_2$ group.

Other objects, features and advantages of the present disclosure will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description. Note that simply because a particular compound is ascribed to one particular generic formula doesn't mean that it cannot also belong to another generic formula.

BRIEF DESCRIPTION OF THE DRAWINGS

The following drawings form part of the present specification and are included to further demonstrate certain aspects of the present disclosure. The invention may be better understood by reference to one of these drawings in combination with the detailed description of specific embodiments presented herein.

FIGS. 1a-d. TEM (transmission electron microscopy) images of a) uncapped Al nanoparticles, b) Al nanoparticles with epoxyhexane cap added 5 minutes after initiation of reaction, c) and d). The uncapped material produces large (~350 nm on a side), polyhedral structures as shown in FIG. 1a. FIG. 1b shows particles produced by addition of the epoxide cap with a 5 minute delay between the start of Al nanoparticle formation and addition of cap. These particles have diameters on the order of 100 nm. FIGS. 1c and 1d show images when the cap is added immediately after initiation of nanoparticle formation. These particles are spherical with much smaller diameters. FIG. 1(d) shows a higher magnification of the immediate addition reaction product. The Al nanoparticle core can be seen along with the organic capping layer.

Aluminum ignition occurs around 600° C., which is accompanied by a mass increase in the TGA as a result of the formation of aluminum oxide.

Figure 16:
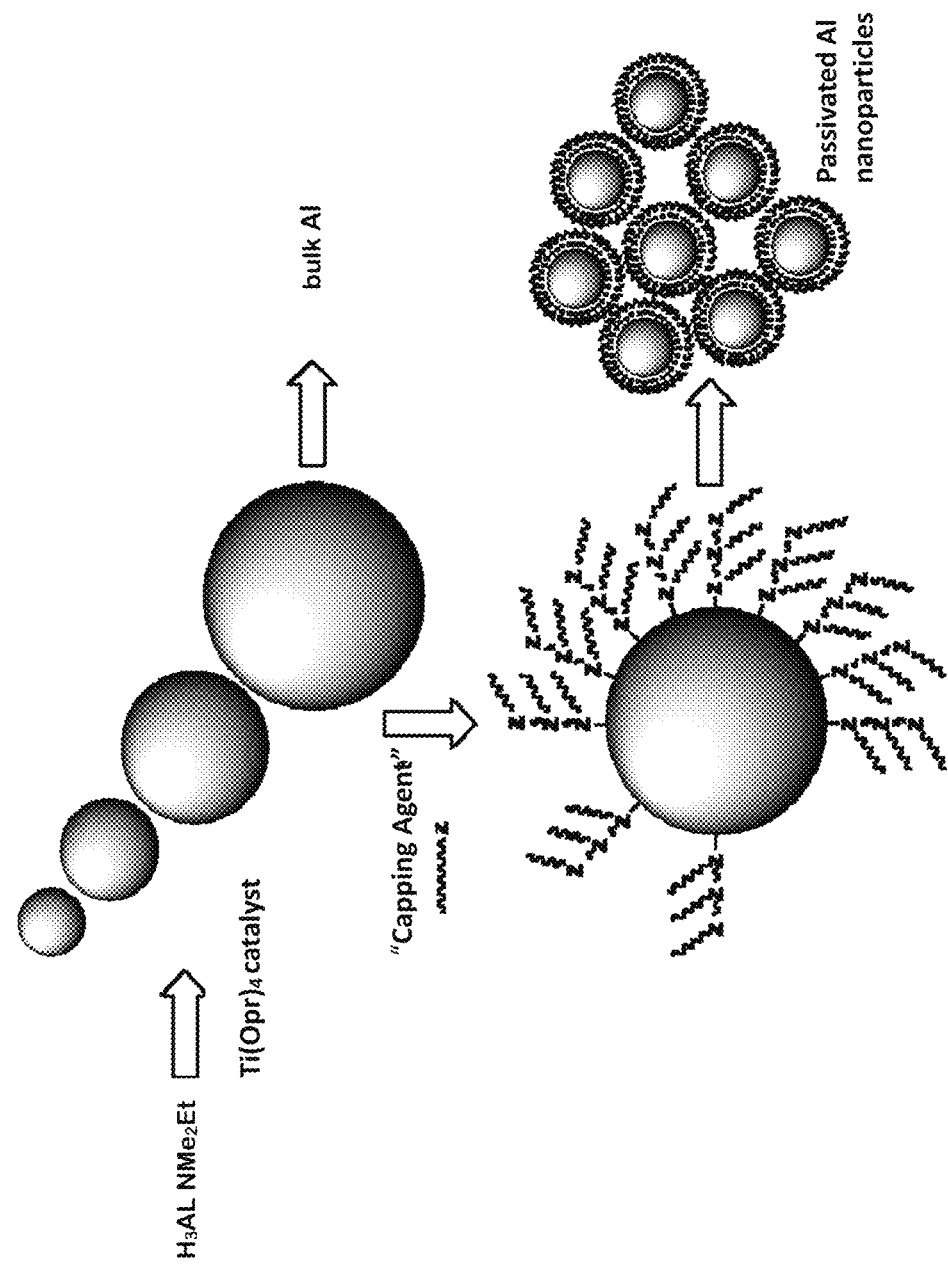

FIG. 16. This schematic diagram shows a simplified synthetic protocol for making passivated Al nanoparticles. They were synthesized following the previously reported method of William Buhro. See Haber and Buhro (1998) and U.S. Pat. No. 5,885,321, which are incorporated herein by reference. Dimethylethylamine alane solution was decomposed in the presence of a catalytic amount of titanium isopropoxide to form nano Al. A capping agent was then added which passivates and stops the growth of the newly formed nanoparticles (NPs).

Figure 17:
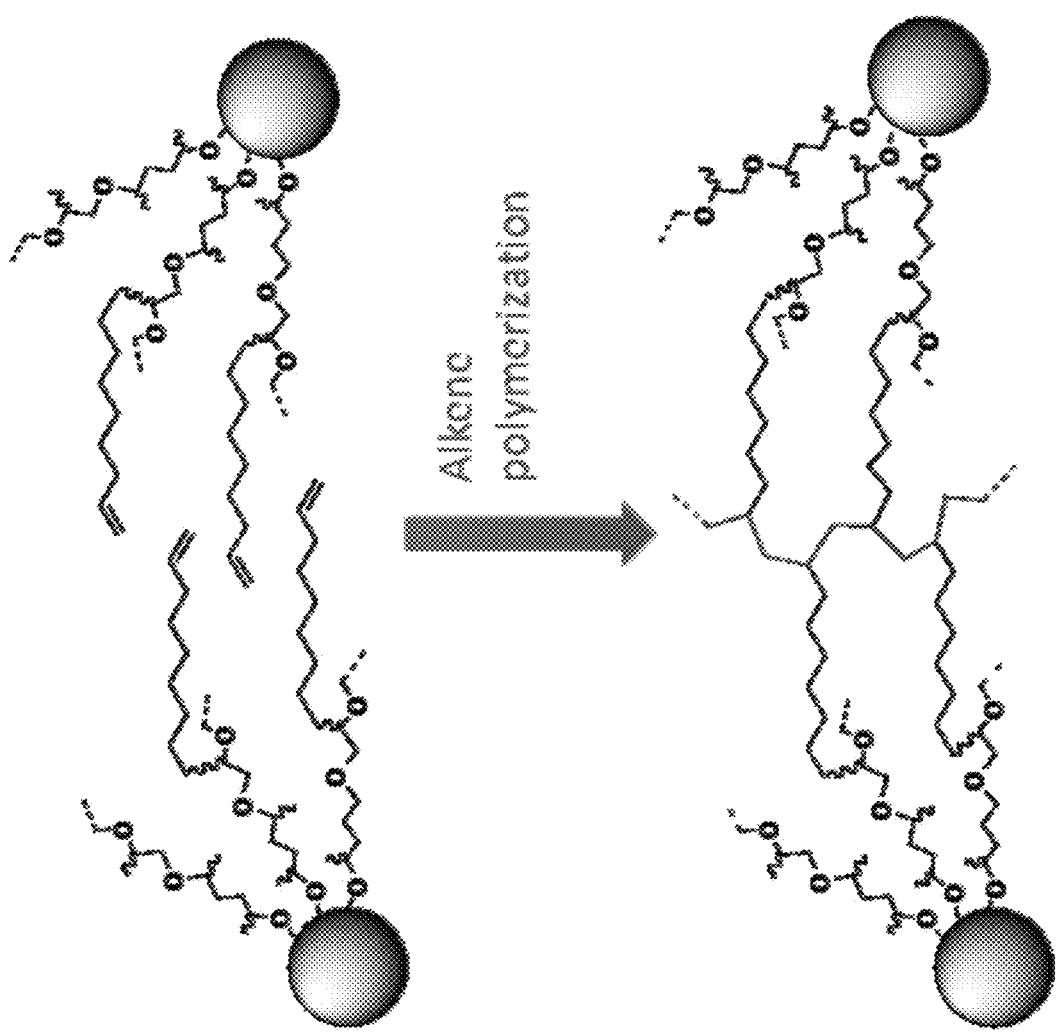

FIG. 17. This schematic diagram shows a simplified synthetic protocol for the thermal initiation of alkene polymerization to make passivated Al nanoparticles with an interconnected hydrophobic polymer shell through the use of monomers such as 1,13 tetradecadiene having a terminal carbon-carbon double bond. A high active Al content of 80% was obtained. This was determined thru a complexometric titration of Al & EDTA using Zn as a primary standard, which gives the total Al content. The active Al was determined thru $H_2$ emission studies.

Figure 18:
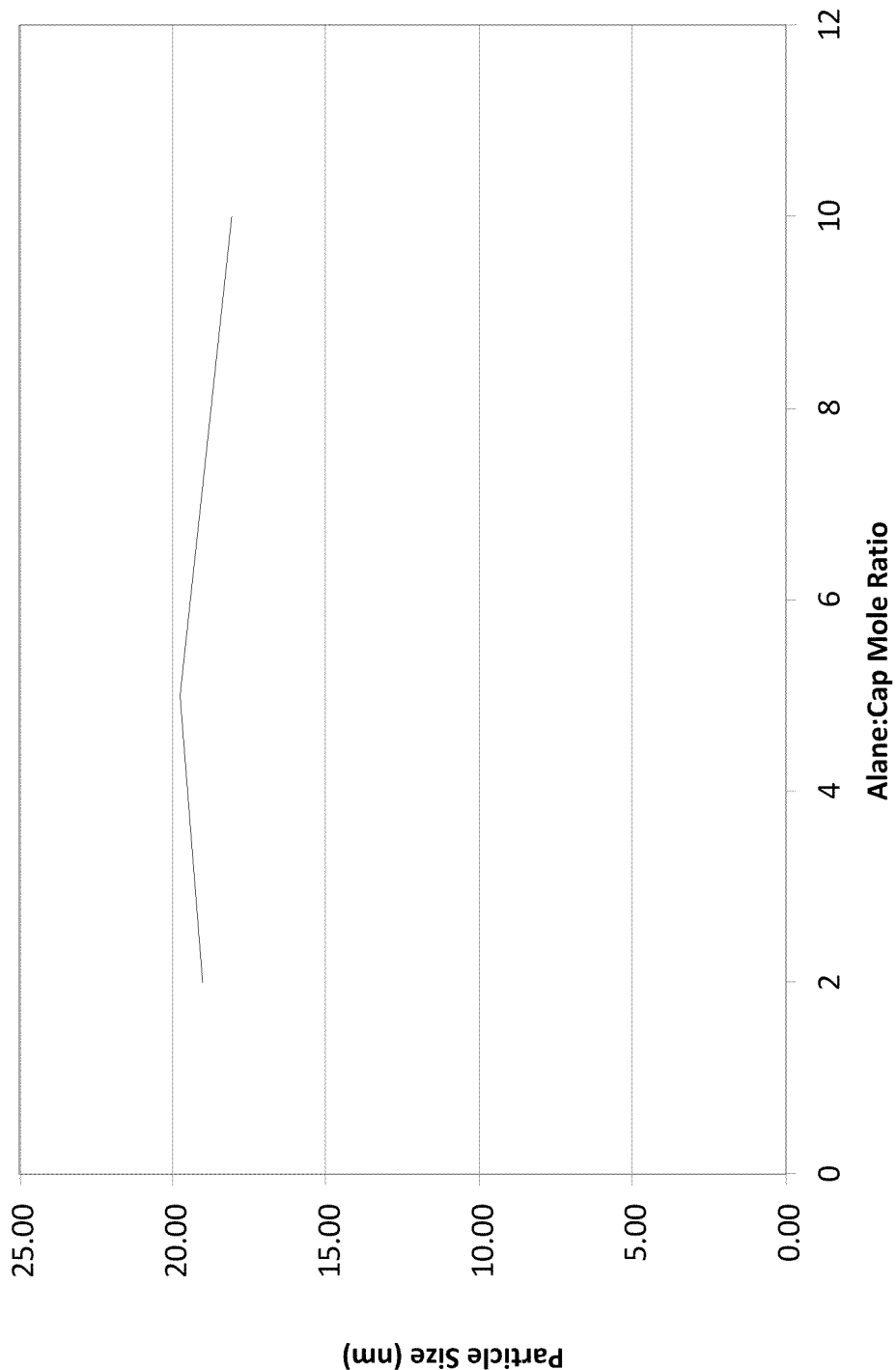

FIG. 18 The Scherrer Equation was used to estimate core size. Here an average core diameter of 19 nm was measured with a fairly narrow size distribution for each Al:cap ratio.

DESCRIPTION OF ILLUSTRATIVE EMBODIMENTS

Disclosed herein are metal nanoparticles having an epoxide-based oligomer coating, compositions thereof, method of making the same, and methods of use thereof, including for energy related applications.

I. DEFINITIONS

The abbreviation "AlNP" and "AlNPs" refers to aluminum nanoparticle and aluminum nanoparticles, respectively.

A "repeat unit" is the simplest structural entity of certain materials, for example, oligomers and/or polymers, whether organic, inorganic or metal-organic. In the case of a an oligomer or polymer chain, repeat units are linked together successively along the chain, like the beads of a necklace. For example, in polyethylene, —[—$CH_2CH_2$—]$_n$—, the repeat unit is —$CH_2CH_2$—. The subscript "n" denotes the degree of polymerisation, that is, the number of repeat units linked together. When the value for "n" is left undefined, it simply designates repetition of the formula within the brackets as well as the polymeric and/or framework nature of the material. The concept of a repeat unit applies equally to where the connectivity between the repeat units extends into three dimensions, such as in metal organic frameworks, cross-linked polymers, thermosetting polymers, etc.

When used in the context of a chemical group, "hydrogen" means —H; "hydroxy" means —OH; "oxo" means =O; "halo" means independently —F, —Cl, —Br or —I; "amino" means —$NH_2$ (see below for definitions of groups containing the term amino, e.g., alkylamino); "hydroxyamino" means —NHOH; "nitro" means —$NO_2$; imino means =NH (see below for definitions of groups containing the term imino, e.g., alkylimino); "cyano" means —CN; "isocyanate" means —N=C=O; "azido" means —$N_3$; in a monovalent context "phosphate" means —OP(O)(OH)$_2$ or a deprotonated form thereof; in a divalent context "phosphate" means —OP(O)(OH)O— or a deprotonated form thereof; "mercapto" means —SH; "thio" means =S; "thioether" means —S—; "sulfonamido" means —NHS(O)$_2$— (see below for definitions of groups containing the term sulfonamido, e.g., alkylsulfonamido); "sulfonyl" means —S(O)$_2$— (see below for definitions of groups containing the term sulfonyl, e.g., alkylsulfonyl); and "sulfinyl" means —S(O)— (see below for definitions of groups containing the term sulfinyl, e.g., alkylsulfinyl).

In the context of chemical formulas, the symbol "—" means a single bond, "=" means a double bond, and "≡" means triple bond. The symbol "----" represents an optional bond, which if present is either single or double. The symbol "⚌" represents a single bond or a double bond. Thus, for example, the structure

includes the structures

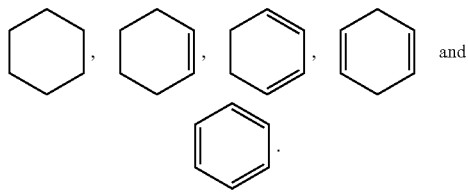

As will be understood by a person of skill in the art, no one such ring atom forms part of more than one double bond. The symbol "⁀", when drawn perpendicularly across a bond indicates a point of attachment of the group. It is noted that the point of attachment is typically only identified in this manner for larger groups in order to assist the reader in rapidly and unambiguously identifying a point of attachment. The symbol "◂" means a single bond where the group attached to the thick end of the wedge is "out of the page." The symbol "⫽" means a single bond where the group attached to the thick end of the wedge is "into the page". The symbol "⁀" means a single bond where the conformation (e.g., either R or S) or the geometry is undefined (e.g., either E or Z).

Any undefined valency on an atom of a structure shown in this application implicitly represents a hydrogen atom bonded to the atom. When a group "R" is depicted as a "floating group" on a ring system, for example, in the formula:

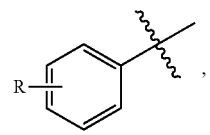

then R may replace any hydrogen atom attached to any of the ring atoms, including a depicted, implied, or expressly defined hydrogen, so long as a stable structure is formed. When a group "R" is depicted as a "floating group" on a fused ring system, as for example in the formula:

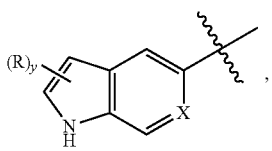

then R may replace any hydrogen attached to any of the ring atoms of either of the fused rings unless specified otherwise. Replaceable hydrogens include depicted hydrogens (e.g., the hydrogen attached to the nitrogen in the formula above), implied hydrogens (e.g., a hydrogen of the formula above that is not shown but understood to be present), expressly defined hydrogens, and optional hydrogens whose presence depends on the identity of a ring atom (e.g., a hydrogen attached to group X, when X equals —CH—), so long as a stable structure is formed. In the example depicted, R may reside on either the 5-membered or the 6-membered ring of the fused ring system. In the formula above, the subscript letter "y" immediately following the group "R" enclosed in parentheses, represents a numeric variable. Unless specified otherwise, this variable can be 0, 1, 2, or any integer greater than 2, only limited by the maximum number of replaceable hydrogen atoms of the ring or ring system.

For the groups and classes below, the following parenthetical subscripts further define the group/class as follows: "(Cn)" defines the exact number (n) of carbon atoms in the group/class. "(C≤n)" defines the maximum number (n) of carbon atoms that can be in the group/class, with the minimum number as small as possible for the group in question, e.g., it is understood that the minimum number of carbon atoms in the group "alkenyl$_{(C\leq8)}$" or the class "alkene$_{(C\leq8)}$" is two. For example, "alkoxy$_{(C\leq10)}$" designates those alkoxy groups having from 1 to 10 carbon atoms (e.g., 1, 2, 3, 4, 5, 6, 7, 8, 9, or 10, or any range derivable therein (e.g., 3 to 10 carbon atoms). (Cn-n') defines both the minimum (n) and maximum number (n') of carbon atoms in the group. Similarly, "alkyl$_{(C2-10)}$" designates those alkyl groups having from 2 to 10 carbon atoms (e.g., 2, 3, 4, 5, 6, 7, 8, 9, or 10, or any range derivable therein (e.g., 3 to 10 carbon atoms)).

The term "saturated" as used herein means the compound or group so modified has no carbon-carbon double and no carbon-carbon triple bonds, except as noted below. The term does not preclude carbon-heteroatom multiple bonds, for example a carbon oxygen double bond or a carbon nitrogen double bond. Moreover, it does not preclude a carbon-carbon double bond that may occur as part of keto-enol tautomerism or imine/enamine tautomerism.

The term "aliphatic" when used without the "substituted" modifier signifies that the compound/group so modified is an acyclic or cyclic, but non-aromatic hydrocarbon compound or group. In aliphatic compounds/groups, the carbon atoms can be joined together in straight chains, branched chains, or non-aromatic rings (alicyclic). Aliphatic compounds/groups can be saturated, that is joined by single bonds (alkanes/alkyl), or unsaturated, with one or more double bonds (alkenes/alkenyl) or with one or more triple bonds (alkynes/alkynyl). When the term "aliphatic" is used without the "substituted" modifier only carbon and hydrogen atoms are present. When the term is used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —N(CH$_3$)$_2$, —C(O)NH$_2$ or —OC(O)CH$_3$.

The term "alkyl" when used without the "substituted" modifier refers to a monovalent saturated aliphatic group with a carbon atom as the point of attachment, a linear or branched, cyclo, cyclic or acyclic structure, and no atoms other than carbon and hydrogen. Thus, as used herein cycloalkyl is a subset of alkyl. The groups —CH$_3$ (Me), —CH$_2$CH$_3$ (Et), —CH$_2$CH$_2$CH$_3$ (n-Pr), —CH(CH$_3$)$_2$ (iso-Pr), —CH(CH$_2$)$_2$ (cyclopropyl), —CH$_2$CH$_2$CH$_2$CH$_3$ (n-Bu), —CH(CH$_3$)CH$_2$CH$_3$ (sec-butyl), —CH$_2$CH(CH$_3$)$_2$ (iso-butyl), —C(CH$_3$)$_3$ (tert-butyl), —CH$_2$C(CH$_3$)$_3$ (neopentyl), cyclobutyl, cyclopentyl, cyclohexyl, and cyclohexylmethyl are non-limiting examples of alkyl groups. The term "alkanediyl" when used without the "substituted" modifier refers to a divalent saturated aliphatic group, with one or two saturated carbon atom(s) as the point(s) of attachment, a linear or branched, cyclo, cyclic or acyclic structure, no carbon-carbon double or triple bonds, and no atoms other than carbon and hydrogen. The groups, —CH$_2$— (methylene), —CH$_2$CH$_2$—, —CH$_2$C(CH$_3$)$_2$CH$_2$—, —CH$_2$CH$_2$CH$_2$—, and

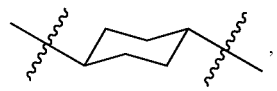 [SMILES: *C1CCC(*)CC1]

are non-limiting examples of alkanediyl groups. The term "alkylidene" when used without the "substituted" modifier refers to the divalent group =CRR' in which R and R' are independently hydrogen, alkyl, or R and R' are taken together to represent an alkanediyl having at least two carbon atoms. Non-limiting examples of alkylidene groups include: =CH$_2$, =CH(CH$_2$CH$_3$), and =C(CH$_3$)$_2$. When any of these terms is used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —N(CH$_3$)$_2$, —C(O)NH$_2$ or —OC(O)CH$_3$. The following groups are non-limiting examples of substituted alkyl groups: —CH$_2$OH, —CH$_2$Cl, —CF$_3$, —CH$_2$CN, —CH$_2$C(O)OH, —CH$_2$C(O)OCH$_3$, —CH$_2$C(O)NH$_2$, —CH$_2$C(O)CH$_3$, —CH$_2$OCH$_3$, —CH$_2$OC(O)CH$_3$, —CH$_2$NH$_2$, —CH$_2$N(CH$_3$)$_2$, and —CH$_2$CH$_2$Cl. The term "fluoroalkyl" is a subset of substituted alkyl, in which one or more hydrogen has been substituted with a fluoro group and no other atoms aside from carbon, hydrogen and fluorine are present. The groups, —CH$_2$F, —CF$_3$, and —CH$_2$CF$_3$ are non-limiting examples of fluoroalkyl groups. An "alkane" refers to the compound H—R, wherein R is alkyl.

The term "alkenyl" when used without the "substituted" modifier refers to an monovalent unsaturated aliphatic group with a carbon atom as the point of attachment, a linear or branched, cyclo, cyclic or acyclic structure, at least one nonaromatic carbon-carbon double bond, no carbon-carbon triple bonds, and no atoms other than carbon and hydrogen. Non-limiting examples of alkenyl groups include: —CH=CH$_2$ (vinyl), —CH=CHCH$_3$, —CH=CHCH$_2$CH$_3$, —CH$_2$CH=CH$_2$ (allyl), —CH$_2$CH=CHCH$_3$, and —CH=CH—C$_6$H$_5$. The term "alkenediyl" when used without the "substituted" modifier refers to a divalent unsaturated aliphatic group, with two carbon atoms as points of attachment, a linear or branched, cyclo, cyclic or acyclic structure, at least one nonaromatic carbon-carbon double bond, no carbon-carbon triple bonds, and no atoms other than carbon and hydrogen. The groups, —CH═CH—, —CH═C(CH₃)CH₂—, —CH═CHCH₂—, and

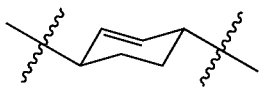

are non-limiting examples of alkenediyl groups. When these terms are used with the "substituted" modifier one or more hydrogen atom has been independently replaced by —OH, —F, —Cl, —Br, —I, —NH₂, —NO₂, —CO₂H, —CO₂CH₃, —CN, —SH, —OCH₃, —OCH₂CH₃, —C(O)CH₃, —N(CH₃)₂, —C(O)NH₂ or —OC(O)CH₃. The groups, —CH═CHF, —CH═CHCl and —CH═CHBr, are non-limiting examples of substituted alkenyl groups. An "alkene" refers to the compound H—R, wherein R is alkenyl. An "alkadiene" refers to a the compound R—R', wherein both R and R' are alkenyl groups, either the same or different types.

The term "alkynyl" when used without the "substituted" modifier refers to an monovalent unsaturated aliphatic group with a carbon atom as the point of attachment, a linear or branched, cyclo, cyclic or acyclic structure, at least one carbon-carbon triple bond, and no atoms other than carbon and hydrogen. As used herein, the term alkynyl does not preclude the presence of one or more non-aromatic carbon-carbon double bonds. The groups, —C≡CH, —C≡CCH₃, and —CH₂C≡CCH₃, are non-limiting examples of alkynyl groups. The term "alkanediyl" when used without the "substituted" modifier refers to a divalent unsaturated aliphatic group, with two carbon atoms as points of attachment, a linear or branched, cyclo, cyclic or acyclic structure, at least one carbon-carbon triple bond, and no atoms other than carbon and hydrogen. When these terms are used with the "substituted" modifier one or more hydrogen atom has been independently replaced by —OH, —F, —Cl, —Br, —I, —NH₂, —NO₂, —CO₂H, —CO₂CH₃, —CN, —SH, —OCH₃, —OCH₂CH₃, —C(O)CH₃, —N(CH₃)₂, —C(O)NH₂ or —OC(O)CH₃. An "alkyne" refers to the compound H—R, wherein R is alkynyl.

The term "aryl" when used without the "substituted" modifier refers to an monovalent unsaturated aromatic group with an aromatic carbon atom as the point of attachment, said carbon atom forming part of a one or more six-membered aromatic ring structure, wherein the ring atoms are all carbon, and wherein the group consists of no atoms other than carbon and hydrogen. If more than one ring is present, the rings may be fused or unfused. As used herein, the term does not preclude the presence of one or more alkyl group (carbon number limitation permitting) attached to the first aromatic ring or any additional aromatic ring present. Non-limiting examples of aryl groups include phenyl(Ph), methylphenyl, (dimethyl)phenyl, —C₆H₄CH₂CH₃ (ethylphenyl), naphthyl, and the monovalent group derived from biphenyl. The term "arenediyl" when used without the "substituted" modifier refers to a divalent aromatic group, with two aromatic carbon atoms as points of attachment, said carbon atoms forming part of one or more six-membered aromatic ring structure(s) wherein the ring atoms are all carbon, and wherein the monovalent group consists of no atoms other than carbon and hydrogen. As used herein, the term does not preclude the presence of one or more alkyl group (carbon number limitation permitting) attached to the first aromatic ring or any additional aromatic ring present. If more than one ring is present, the rings may be fused or unfused. Non-limiting examples of arenediyl groups include:

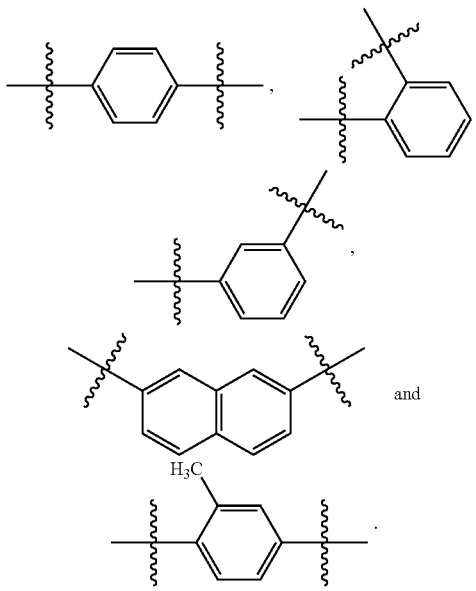

and

When these terms are used with the "substituted" modifier one or more hydrogen atom has been independently replaced by —OH, —F, —Cl, —Br, —I, —NH₂, —NO₂, —CO₂H, —CO₂CH₃, —CN, —SH, —OCH₃, —OCH₂CH₃, —C(O)CH₃, —N(CH₃)₂, —C(O)NH₂ or —OC(O)CH₃. An "arene" refers to the compound H—R, wherein R is aryl.

The term "aralkyl" when used without the "substituted" modifier refers to the monovalent group -alkanediyl-aryl, in which the terms alkanediyl and aryl are each used in a manner consistent with the definitions provided above. Non-limiting examples of aralkyls are: phenylmethyl(benzyl, Bn) and 2-phenyl-ethyl. When the term is used with the "substituted" modifier one or more hydrogen atom from the alkanediyl and/or the aryl has been independently replaced by —OH, —F, —Cl, —Br, —I, —NH₂, —NO₂, —CO₂H, —CO₂CH₃, —CN, —SH, —OCH₃, —OCH₂CH₃, —C(O)CH₃, —N(CH₃)₂, —C(O)NH₂ or —OC(O)CH₃. Non-limiting examples of substituted aralkyls are: (3-chlorophenyl)-methyl, and 2-chloro-2-phenyl-eth-1-yl.

The term "heteroaryl" when used without the "substituted" modifier refers to a monovalent aromatic group with an aromatic carbon atom or nitrogen atom as the point of attachment, said carbon atom or nitrogen atom forming part of an aromatic ring structure wherein at least one of the ring atoms is nitrogen, oxygen or sulfur, and wherein the group consists of no atoms other than carbon, hydrogen, aromatic nitrogen, aromatic oxygen and aromatic sulfur. As used herein, the term does not preclude the presence of one or more alkyl group (carbon number limitation permitting) attached to the aromatic ring or any additional aromatic ring present. Non-limiting examples of heteroaryl groups include furanyl, imidazolyl, indolyl, indazolyl (Im), methylpyridyl, oxazolyl, pyridyl, pyrrolyl, pyrimidyl, pyrazinyl, quinolyl, quinazolyl, quinoxalinyl, thienyl, and triazinyl. The term "heteroarenediyl" when used without the "substituted" modifier refers to an divalent aromatic group, with two aromatic carbon atoms, two aromatic nitrogen atoms, or one aromatic carbon atom and one aromatic nitrogen atom as the two points of attachment, said atoms forming part of one or more aromatic ring structure(s) wherein at least one of the ring atoms is nitrogen, oxygen or sulfur, and wherein the divalent group consists of no atoms other than carbon, hydrogen, aromatic nitrogen, aromatic oxygen and aromatic sulfur. As used herein, the term does not preclude the presence of one or more alkyl group (carbon number limitation permitting) attached to the first aromatic ring or any additional aromatic ring present. If more than one ring is present, the rings may be fused or unfused. Non-limiting examples of heteroarenediyl groups include:

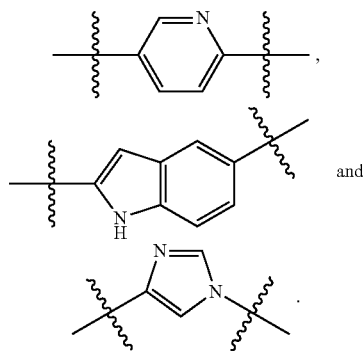

and

When these terms are used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —N(CH$_3$)$_2$, —C(O)NH$_2$ or —OC(O)CH$_3$.

The term "acyl" when used without the "substituted" modifier refers to the group —C(O)R, in which R is a hydrogen, alkyl, aryl, aralkyl or heteroaryl, as those terms are defined above. The groups, —CHO, —C(O)CH$_3$ (acetyl, Ac), —C(O)CH$_2$CH$_3$, —C(O)CH$_2$CH$_2$CH$_3$, —C(O)CH(CH$_3$)$_2$, —C(O)CH(CH$_2$)$_2$, C(O)C$_6$H$_5$, —C(O)C$_6$H$_4$—CH$_3$, —C(O)CH$_2$C$_6$H$_5$, —C(O)(imidazolyl) are non-limiting examples of acyl groups. A "thioacyl" is defined in an analogous manner, except that the oxygen atom of the group —C(O)R has been replaced with a sulfur atom, —C(S)R. When either of these terms is used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —N(CH$_3$)$_2$, —C(O)NH$_2$ or —OC(O)CH$_3$. The groups, —C(O)CH$_2$CF$_3$, —CO$_2$H (carboxyl), —CO$_2$CH$_3$ (methylcarboxyl), —CO$_2$CH$_2$CH$_3$, —C(O)NH$_2$ (carbamoyl), and —CON(CH$_3$)$_2$, are non-limiting examples of substituted acyl groups.

The term "alkoxy" when used without the "substituted" modifier refers to the group —OR, in which R is an alkyl, as that term is defined above. Non-limiting examples of alkoxy groups include: —OCH$_3$, —OCH$_2$CH$_3$, —OCH$_2$CH$_2$CH$_3$, —OCH(CH$_3$)$_2$, —OCH(CH$_2$)$_2$, —O-cyclopentyl, and —O-cyclohexyl. The terms "alkenyloxy", "alkynyloxy", "aryloxy", "aralkoxy", "heteroaryloxy", and "acyloxy", when used without the "substituted" modifier, refers to groups, defined as —OR, in which R is alkenyl, alkynyl, aryl, aralkyl, heteroaryl, and acyl, respectively. Similarly, the term "alkylthio" when used without the "substituted" modifier refers to the group —SR, in which R is an alkyl, as that term is defined above. When any of these terms is used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —N(CH$_3$)$_2$, —C(O)NH$_2$ or —OC(O)CH$_3$. The term "alcohol" corresponds to an alkane, as defined above, wherein at least one of the hydrogen atoms has been replaced with a hydroxy group.

The term "alkylamino" when used without the "substituted" modifier refers to the group —NHR, in which R is an alkyl, as that term is defined above. Non-limiting examples of alkylamino groups include: —NHCH$_3$ and —NHCH$_2$CH$_3$. The term "dialkylamino" when used without the "substituted" modifier refers to the group —NRR', in which R and R' can be the same or different alkyl groups, or R and R' can be taken together to represent an alkanediyl. Non-limiting examples of dialkylamino groups include: —N(CH$_3$)$_2$, —N(CH$_3$)(CH$_2$CH$_3$), and N-pyrrolidinyl. The terms "alkoxyamino", "alkenylamino", "alkynylamino", "arylamino", "aralkylamino", "heteroarylamino", and "alkylsulfonylamino" when used without the "substituted" modifier, refers to groups, defined as —NHR, in which R is alkoxy, alkenyl, alkynyl, aryl, aralkyl, heteroaryl, and alkylsulfonyl, respectively. A non-limiting example of an arylamino group is —NHC$_6$H$_5$. The term "amido" (acylamino), when used without the "substituted" modifier, refers to the group —NHR, in which R is acyl, as that term is defined above. A non-limiting example of an amido group is —NHC(O)CH$_3$. The term "alkylimino" when used without the "substituted" modifier refers to the divalent group =NR, in which R is an alkyl, as that term is defined above. When any of these terms is used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —N(CH$_3$)$_2$, —C(O)NH$_2$ or —OC(O)CH$_3$. The groups —NHC(O)OCH$_3$ and —NHC(O)NHCH$_3$ are non-limiting examples of substituted amido groups.

In addition, atoms making up the compounds of the present invention are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}$C and $^{14}$C. Similarly, it is contemplated that one or more carbon atom(s) of a compound of the present invention may be replaced by a silicon atom(s). Furthermore, it is contemplated that one or more oxygen atom(s) of a compound of the present invention may be replaced by a sulfur or selenium atom(s).

Any undefined valency on an atom of a structure shown in this application implicitly represents a hydrogen atom bonded to the atom.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result.

The term "hydrate" when used as a modifier to a compound means that the compound has less than one (e.g., hemihydrate), one (e.g., monohydrate), or more than one (e.g., dihydrate) water molecules associated with each compound molecule, such as in solid forms of the compound.

An "isomer" of a first compound is a separate compound in which each molecule contains the same constituent atoms as the first compound, but where the configuration of those atoms in three dimensions differs.

The term "saturated" when referring to an atom means that the atom is connected to other atoms only by means of single bonds.

The above definitions supersede any conflicting definition in any of the reference that is incorporated by reference herein. The fact that certain terms are defined, however, should not be considered as indicative that any term that is undefined is indefinite. Rather, all terms used are believed to describe the invention in terms such that one of ordinary skill can appreciate the scope and practice the present invention.

II. SYNTHETIC METHODS

Metal nanoparticles having an epoxide-based coating may be made using the methods outlined below in the examples. For example, disclosed herein is capping scheme for producing stable aluminum nanoparticles with diameters, in some embodiments, on the order of 20 nm. The particles are capped using an epoxide reagent that subsequently polymerizes on the nanoparticle's surface to produce a polyether. The result is a novel structure with the highly oxophilic aluminum nanoparticle core surrounded with a protective oxygen-rich polyether cap.

Following the methods of Buhro and coworkers (Tyagi et al., 2008), which is incorporated herein by reference, aluminum nanoparticles were synthesized via reaction (1). Alane decomposes in the presence of catalytic amounts of titanium isopropoxide.

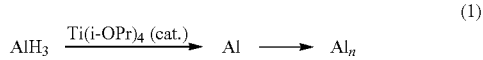

(1)

The decomposition of alane continues uncontrolled to form a metallic mirror in the absence of a capping agent. This material is pyrophoric, consisting of cubic and polygonal particles that are 350 to 500 nm wide and are dispersable in methanol (see FIG. 1a).

Figure 2:
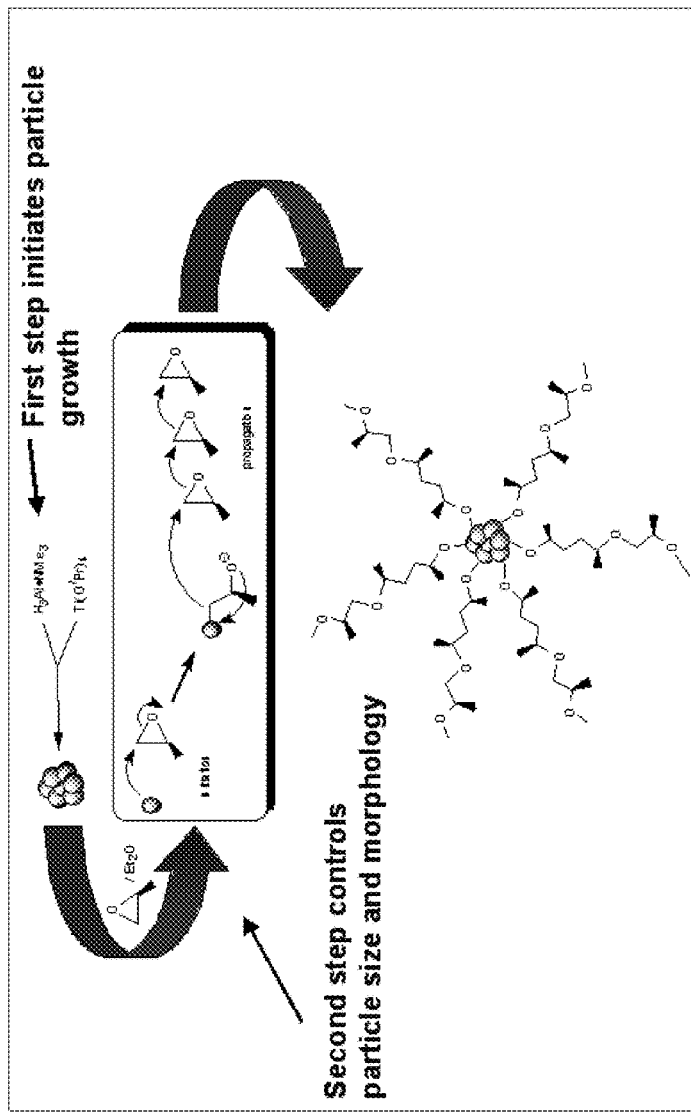
FIG. 2. Proposed scheme for the capping of the aluminum nanoparticle with epoxides.

However following the addition of appropriate epoxides, the material is no longer pyrophoric. The capping agent is effective in passivating the aluminum nanomaterial. A proposed scheme for the capping of the aluminum nanoparticle with epoxides is shown in FIG. 2. The scheme shows that the epoxides have formed into a polyether cap around the nanoparticle. The polymerization may be anionic or cationic. Most likely, it follows an anionic polymerization route in which the oxygen atom has an anionic charge during propagation. The Al particle may act as an initiator, opening the epoxide rings and enabling propagation. The first oxygen atom on a polyether chain may then coordinate with the Al particle and form a strong Al—O bond. Table 1 shows the results for various epoxides added in 1:1 and 5:1 Al:cap molar ratios.

After reaction and removal of the solvent the material shows different physical appearances depending on the molar ratio of aluminum to epoxide. The 5:1 samples produce gray powders. The 1:1 samples initially produce brown or blackish homogenous mixtures, which separate after several seconds. Solid particles precipitate from the solution, forming a heterogeneous mixture of dark solid particles and a dark, translucent supernatant. A syringe was used to draw and separate the supernatant from the solid material and then a vacuum was applied to both the supernatant and the dark solid material to remove the solvent. The resulting supernatant afforded a gelatinous material. All of the above materials were analyzed individually by FTIR and showed similar results. Only the supernatant was analyzed by $^{13}C$ NMR spectroscopy.

Figure 1:
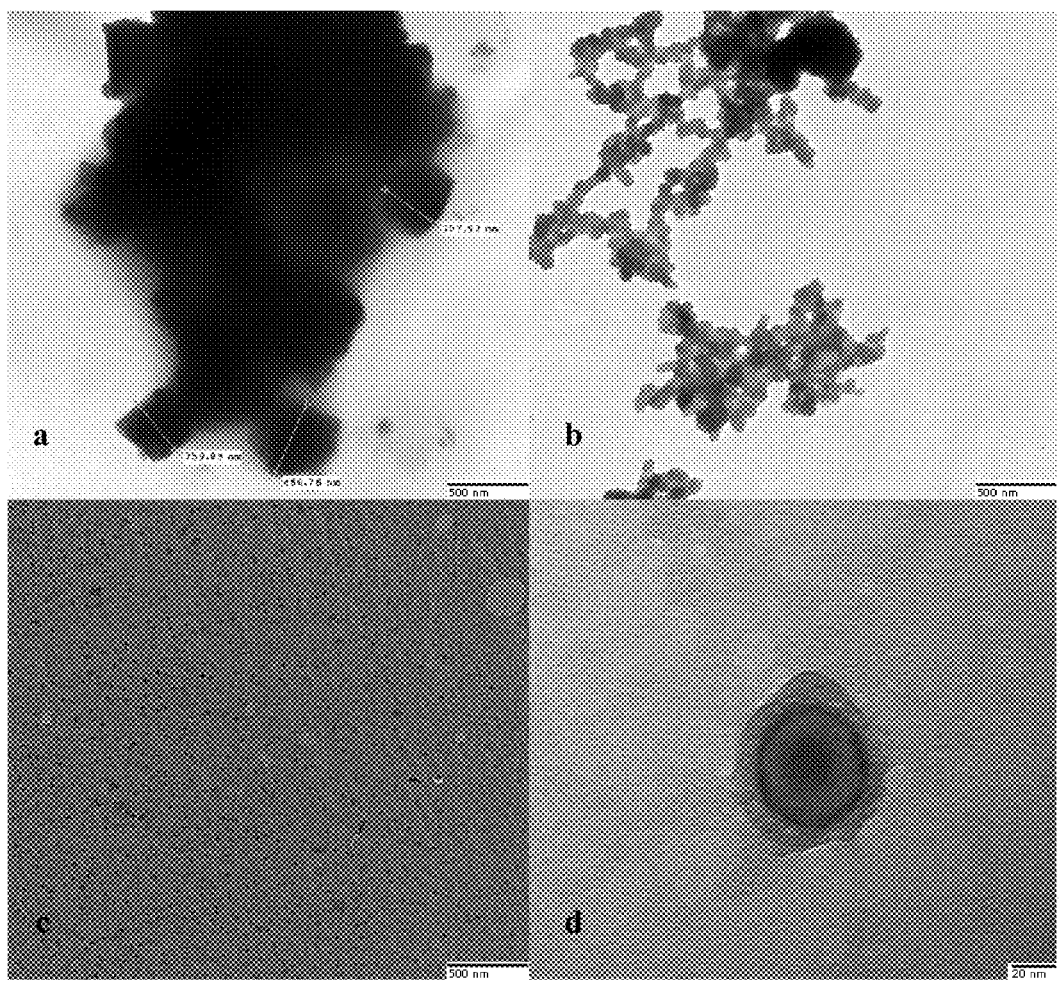

TEM images for various samples are presented in FIGS. 1a-d. The uncapped material produces large (~350 nm on a side), polyhedral structures as shown in FIG. 1a. This is in agreement with results previously reported (Haber and Buhro, 1998), which is incorporated by reference herein. Epoxide-capped products were also analyzed. The 5:1 ratio samples were analyzed with TEM, but the 1:1 ratio samples were not analyzed because an excessive amount of capping agent interferes with TEM analysis. FIG. 1b shows particles produced by addition of the epoxide cap with a 5 minute delay between the start of Al nanoparticle formation and addition of cap. These particles have diameters on the order of 100 nm. FIGS. 1c and 1d show images when the cap is added immediately after initiation of nanoparticle formation. These particles are spherical with much smaller diameters. FIG. 1(d) shows a higher magnification of the immediate addition reaction product. The Al nanoparticle core can be seen along with the organic capping layer.

Both epoxyhexane and epoxydodecane at 1:1 and at 5:1 ratios produce air stable, non-pyrophoric products while the epoxyisobutane products are not air-stable. The 5:1 epoxyisobutane product ignites violently upon exposure to air. The 1:1 epoxyisobutane product does not ignite but rapidly oxidizes to a white powder. Further analysis of the epoxyisobutane-capped samples reveals no remaining unoxidized Al.

Figure 3:
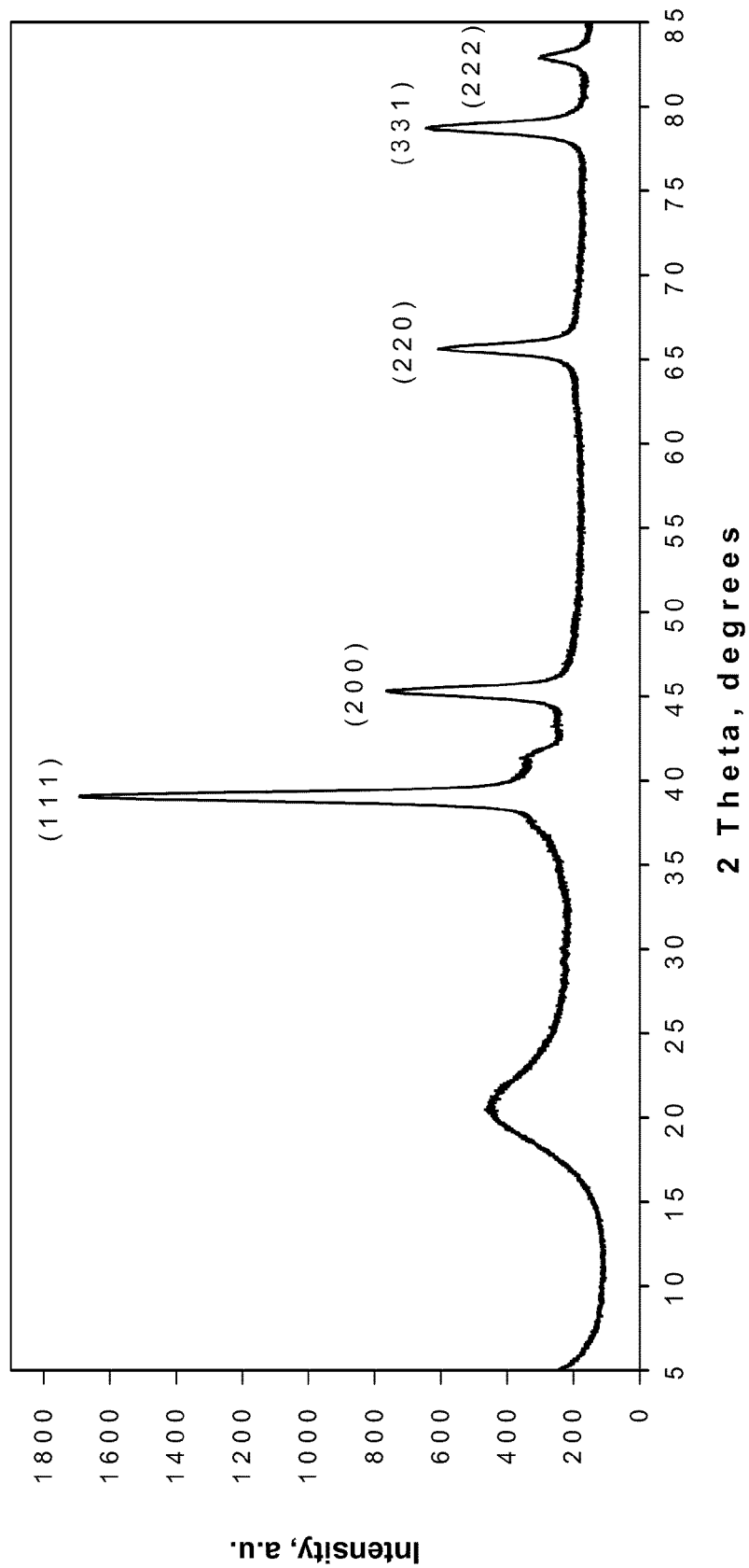
FIG. 3. Representative powder X-ray diffraction (PXRD) spectrum for aluminum nanoparticles capped with epoxydodecane at a 5:1 ratio.

A representative powder X-ray diffraction (PXRD) spectrum for aluminum nanoparticles capped with epoxydodecane at a 5:1 ratio is shown in FIG. 3. The spectrum matches that for crystalline aluminum with no aluminum oxide peaks observed. The broad peak at low angle is due to the organic fraction in the sample. The PXRD spectra for epoxydodecane and epoxyhexane give similar results. The size of the nanoparticles based on the PXRD peak widths were estimated using the Scherrer equation. Sizes were also estimated using TEM measurements. These results are presented in Table 2.

While PXRD spectra do not show the presence of $Al_2O_3$ this is often the case even when an oxide layer is present because it may be amorphous. See (Yang et al., 2006), which is incorporated by reference herein. The fraction of active aluminum in these nanoparticles were measured using hydrogen emission coupled with an EDTA titration to measure total aluminum content. The 5:1 epoxydodecane-capped nanoparticle material contains 25% aluminum by weight. Hydrogen emission of particles exposed to air for ½ hour have 96% of the total aluminum present as active (unoxidized) aluminum. For comparison, typical 25 nm Al particles that are oxide-passivated with a 3 or 6 nm oxide coating will have 31% and 23% active aluminum, respectively.

Figure 4:
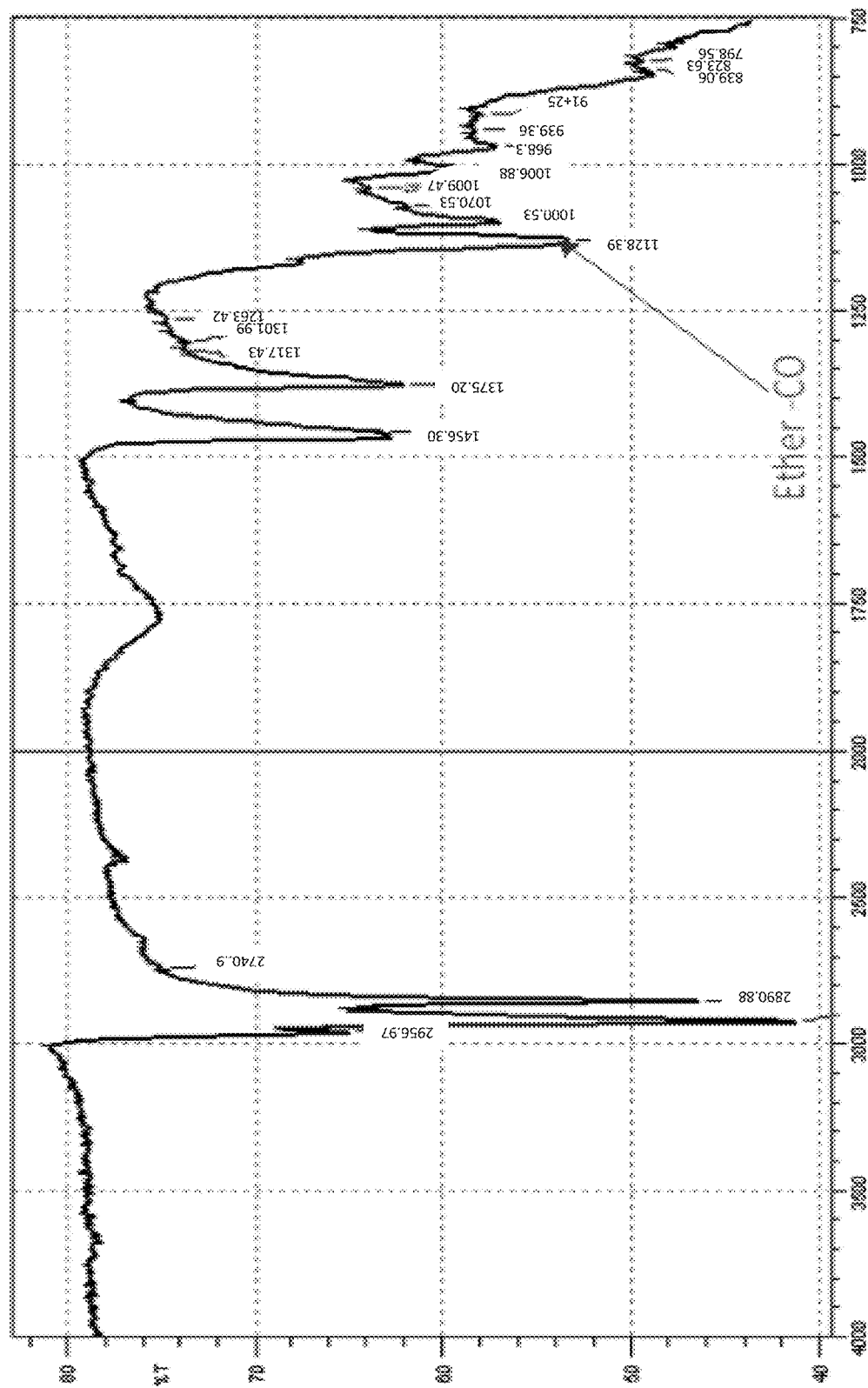
FIG. 4. Representative FTIR spectrum for 1:1 epoxydodecane-capped Al nanoparticles. The polyether stretching peak is identified on the spectrum.
Figure 5:
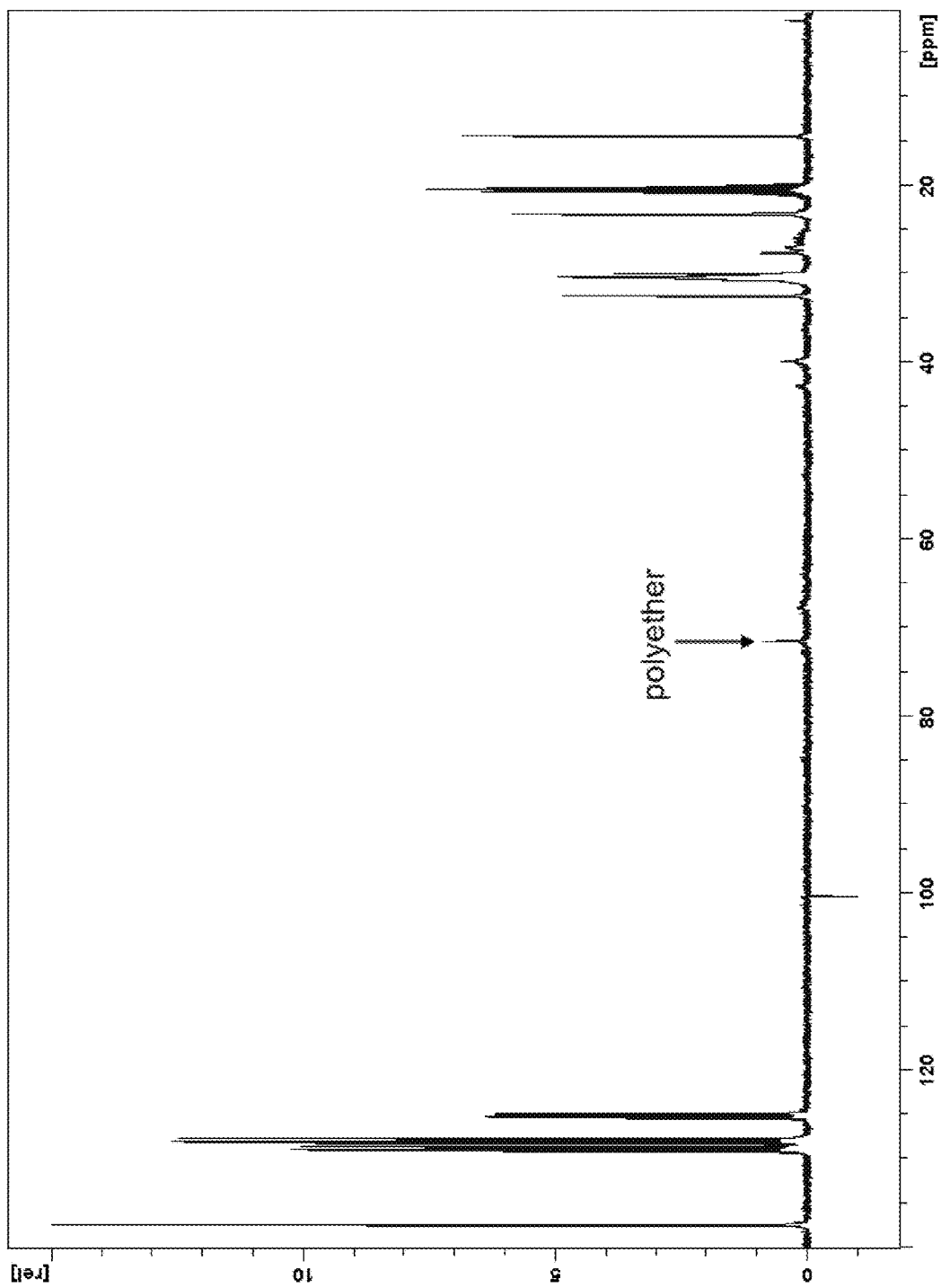
FIG. 5. Representative $^{13}$C NMR spectrum for 1:1 epoxydodecane-capped Al nanoparticles. The polyether chain $^{13}$C resonances are identified in this spectrum. The $^{13}$C NMR data shown for the poly(epoxydodecane)-capped Al nanoparticles is consistent with that previously observed for atactic polypropylene oxide).

The nature of the organic capping structure was investigated using FTIR and NMR spectroscopy. FIG. 4 shows a representative FTIR spectrum for 1:1 epoxydodecane-capped Al nanoparticles. The polyether stretching peak is identified on the spectrum. FIG. 5 shows a representative $^{13}$C NMR spectrum for 1:1 epoxydodecane-capped Al nanoparticles. The polyether chain $^{13}$C resonances are identified in this spectrum. The $^{13}$C NMR data shown for the poly (epoxydodecane)-capped Al nanoparticles is consistent with that previously observed for atactic poly(propylene oxide). See (Schilling and Tonelli, 1986; Garcia et al., 2002), which are incorporated by reference herein. Both of these spectroscopic methods show the presence of a polyether functionality in the nanoparticle product with the absence of peaks for the epoxide precursor, supporting the polyether polymerization scheme of FIG. 2.

TABLE 1

Stability and Solubility of Al Samples.

| Epoxide Cap | Ratio (Al:epoxide) | Stability | Solubility in toluene |
|---|---|---|---|
| 1,2-epoxyisobutane | 5:1 | Pyrophoric | X |
| 1,2-epoxyhexane | 5:1 | Non-pyrophoric | Dispersible |
| 1,2-epoxydodecane | 5:1 | Non-pyrophoric | Dispersible |
| 1,2-epoxyisobutane | 1:1 | Non-pyrophoric | Soluble |
| 1,2-epoxyhexane | 1:1 | Non-pyrophoric | Soluble |
| 1,2-epoxydodecane | 1:1 | Non-pyrophoric | Soluble |

TABLE 2

Sizes of Al Samples Measured With TEM and PXRD.

| Epoxide Cap | Ratio (Al:epoxide) | Size TEM | Size XRD |
|---|---|---|---|
| 1,2-epoxyhexane | 5:1 | ~30 nm | (111) peak: 20.9 nm (200) peak: 17.3 nm |
| 1,2-epoxydodecane | 5:1 | ~35 nm | (111) peak: 15.8 nm (200) peak: 17.1 nm |

These methods can be further modified, extended to other metals (e.g., Mg, Cr, Fe), optimized and scaled up using the principles and techniques of chemistry and/or materials science as applied by a person skilled in the art. Also the methods can be modified by using different reaction conditions, such as heating the reagents.

III. PROPERTIES AND USES OF COATED METAL NANOPARTICLES

As described above, capping and stabilization of metal nanoparticles may be effectively accomplished using, for example, alkyl-substituted epoxide capping agents. The nanoparticles are thereby stabilized against further growth, and oxidation is significantly inhibited by the organic capping layer. The organic shell that caps the nanoparticles may be an oxygen-rich polyether layer. While this oxygen-rich layer is present, the metal core of the nanoparticles have very low oxide content. In some embodiments, less than 10% metal oxide, in other embodiments less than 5% metal oxide.

The coated metal nanoparticles provided by the present disclosure, may be used for are valuable for many energy-related applications. For example, in the case of aluminum and magnesium, these applications stem from the low atomic number of these metals, their low density, high abundance, low cost. In the case of Al, Fe and Cr, it stems from their 3 electron oxidation potential. Aluminum coated nano-particles may be used in thermite reactions, as propellants for rockets, in magnetohydrodynamic generators, and other applications. Aluminum's advantage over comparable organic solids as propellants is its high energy density. In addition to the long history of aluminum as a solid propellant, it has also recently been discussed as an additive to liquid fuels. For example, the coated metal nanoparticles may be used to increase the ignition probability of hydrocarbon fuels, such as diesel. See (Tyagi et al., 2008), which is incorporated by reference herein.

IV. EXAMPLES

The following examples are included to demonstrate particular embodiments of the invention. It should be appreciated by those of skill in the art that the techniques disclosed in the examples which follow represent techniques discovered by the inventor to function well in the practice of the invention, and thus can be considered to constitute particular modes for its practice. However, those of skill in the art should, in light of the present disclosure, appreciate that many changes can be made in the specific embodiments which are disclosed and still obtain a like or similar result without departing from the spirit and scope of the invention.

Methods and Materials

A 0.5 M N,N-dimethylethylamine alane solution in toluene, titanium (IV) isopropoxide (99.999% trace metals basis), 1,2-epoxy-isobutane (97%), 1,2-epoxyhexane (97%), 1,2-epoxydodecane (95%), disodium ethylenediaminetetraacetate dihydrate (Na$_2$EDTA 2H$_2$O, ~99%), xylenol orange, and ZnSO$_4$ 7H$_2$O (99.999% trace metals basis) were all supplied by Sigma Aldrich. All solvents were distilled under a dry argon atmosphere in order to remove water and oxygen. Concentrated HNO$_3$ and NaOH pellets were used.

The materials were analyzed with Fourier transform-infrared spectroscopy (FT-IR) using a Shimadzu model FTIR-84005 spectrometer equipped with an attenuated total reflectance (ATR) attachment. Each measurement was typically based on 10 scans. 1:1 samples were analyzed by $^{13}$C NMR spectroscopy with a Bruker Ultrashield 400 MHz spectrometer. All 1:1 samples were dissolved in d$_8$-toluene for $^{13}$C NMR analysis. TEM (transmission electron microscopy) images were obtained using a Hitachi H-7600 operated at 100 kV. Samples were prepared from solution by drip spotting on carbon coated copper grids. X-ray powder diffraction (XRD) analysis was performed on a Bruker D8-Advanced equipped with a Cuα source and a Sol-X detector. Identification of the observed patterns was accomplished by comparison to the ICDD crystallographic database.

Speculation of aluminum was determined by reaction of nanoparticle samples with 5 M NaOH in a gas retort attached to a 50 ml gas buret filled with a saturated solution of NaCl following the method of Glotov and Zyryanov (1991). Total aluminum content within a sample was determined using a Zn$^{+2}$-EDTA back titration method (Yang et al., 2006).

Example 1

Synthesis of Al Nanoparticles Capped with Epoxides without Heating.

All reactions were carried out in an Innovative Technology glovebox or on a Schlenk line. For each reaction, 13 ml of N,N-dimethylethylamine alane solution (0.0065 mol) in toluene was injected into a beaker with a luer lock syringe. Then, 25 ml of diethyl ether was added to the alane solution and the reaction mixture was stirred with a magnetic stirrer. The titanium isopropoxide solution was prepared by mixing 16 μL of titanium isopropoxide with 1.6 mL of toluene, which was injected into the stirred reaction mixture, affording a color change from a white cloudy appearance to a dark black color. Immediately, a stoichiometric amount of epoxide was added as the capping agent. For each capping agent, 5:1 and 1:1 molar ratios of alane:epoxide were investigated. After stirring the reaction adequately, the solvent was removed from the reaction mixture under vacuum while stirring.

Example 2

Synthesis of Al Nanoparticles Capped with Epoxides with Heating.

All reactions were completed on a Schlenk line under an argon atmosphere. The epoxide was present in reaction flask with temperature maintained at 95° C. with vigorous stirring using a magnetic stirrer. 4 mL of alane and 10 mL of toluene were added to the heated alkane using a leur lock syringe. 10 μL of titanium isopropoxide catalyst was then added to the alane mixture, turning the clear colorless mixture to a dark-brown to black mixture. The reaction was allowed to stir for approximately 1 minute. After 1 minute, the excess solvent was removed in vacuo while stirring at 95° C.

Example 3

Inclusion of Alkenes and Formation of a Polymerized Cap.

This example demonstrates that using organic capping agents with appropriate alkene functional groups can provide significantly enhanced stabilization of the small aluminum core of the aluminum-organic core-shell nanoparticle. Specifically, appropriate inclusion of alkenes into the organic capping molecules leads to polymerization of the alkene to form a polymerized cap.

As reported in this example, this principle may be accomplished, for example, using 1,2-epoxy-9-decene. Without being bound by theory, the aluminum nanoparticle (Al NP) core acts as a ring-opening catalyst, leading to formation of a polyether from the epoxide functional group of 1,2-epoxy-9-decene. The local Al NP core also leads to cross polymerization of the alkene functional groups on the newly formed capping polyether. A further demonstration of this method comes from the co-polymerization of 1,2-epoxy-9-decene and 1,13-tetradecadiene. Another result from this study is that the epoxide functional group is not necessary to stabilize the Al NP core when the diene is used exclusively as the capping agent.

All reactions were performed under argon atmosphere. For this demonstration, a Schlenk line was used. Other methods for providing a dry, oxygen-free environment should also be sufficient. First, a clean, dry round bottom reaction flask was charged with 6.5 mL 0.5M N,N-dimethylethylamine alane ($Me_2EtN.AlH_3$) solution in toluene and 15 mL freshly distilled toluene. This solution was then heated to 85° C. while stirring. Once the desired temperature was reached, 0.8 mL of a 0.0338M titanium isopropoxide solution in toluene was added, followed by the immediate addition of capping agent to protect the nascent nanoparticles from degradation & agglomeration. The resulting mixture was refluxed at 85° C. for 45 min. After cooling to room temperature, all solvent was removed en vacuo. The resulting black/dark gray solid was then heated overnight at 85° C. while under vacuum to remove any trace solvent still present.

Figure 6A:
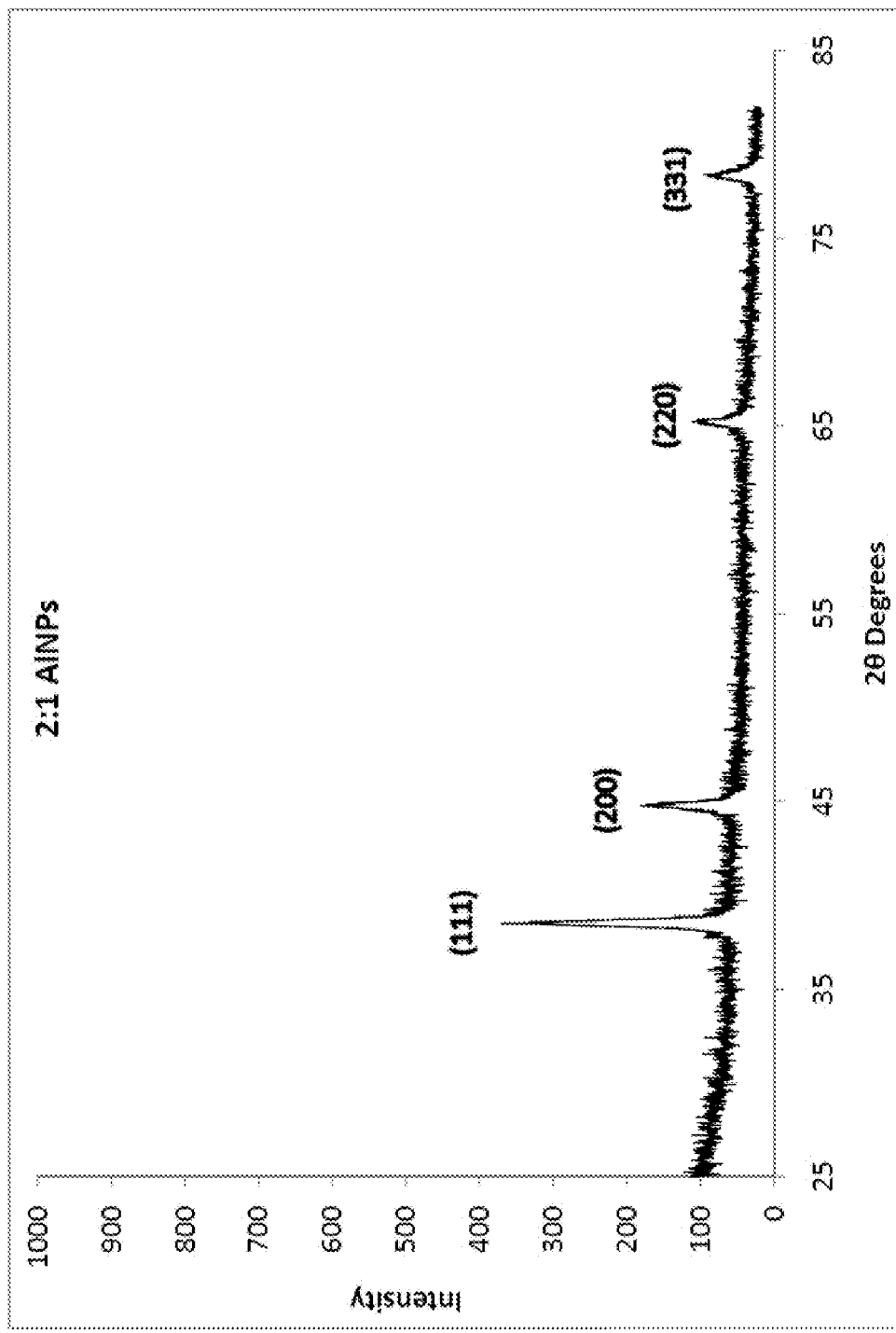
FIGS. 6a-c. PXRD of AlNPs capped with 2:1, 5:1, & 10:1 mole ratios of Al:epoxydecene. PXRD results are presented for AlNPs capped with 1,2-epoxy-9-decene. According to the ICDD Crystallographic Database, the peaks located at $2\Theta \approx 39°$, 45°, 65°, & 79° correspond to face-centered cubic (fcc), metallic Al.
Figure 6B:
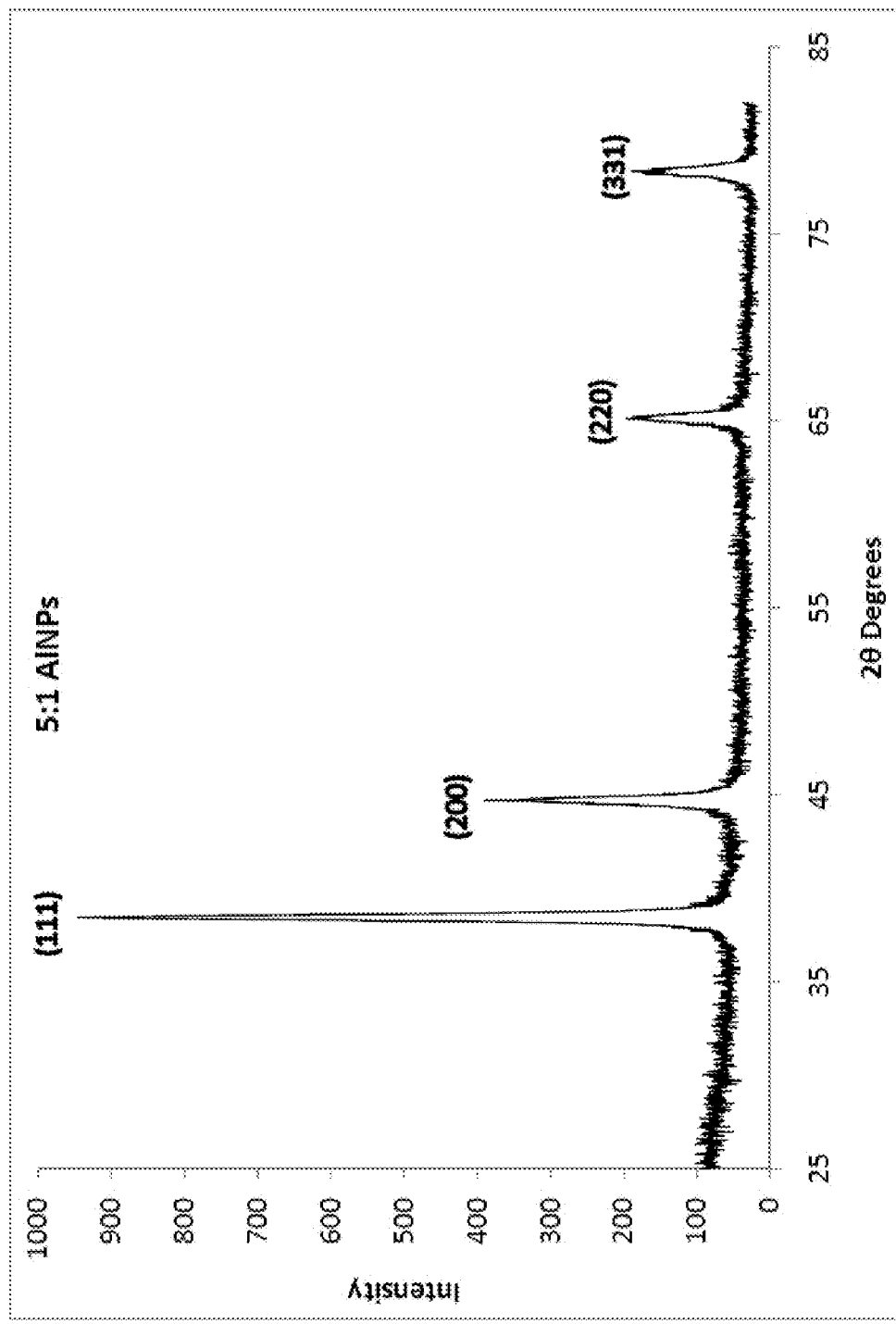
Figure 6C:
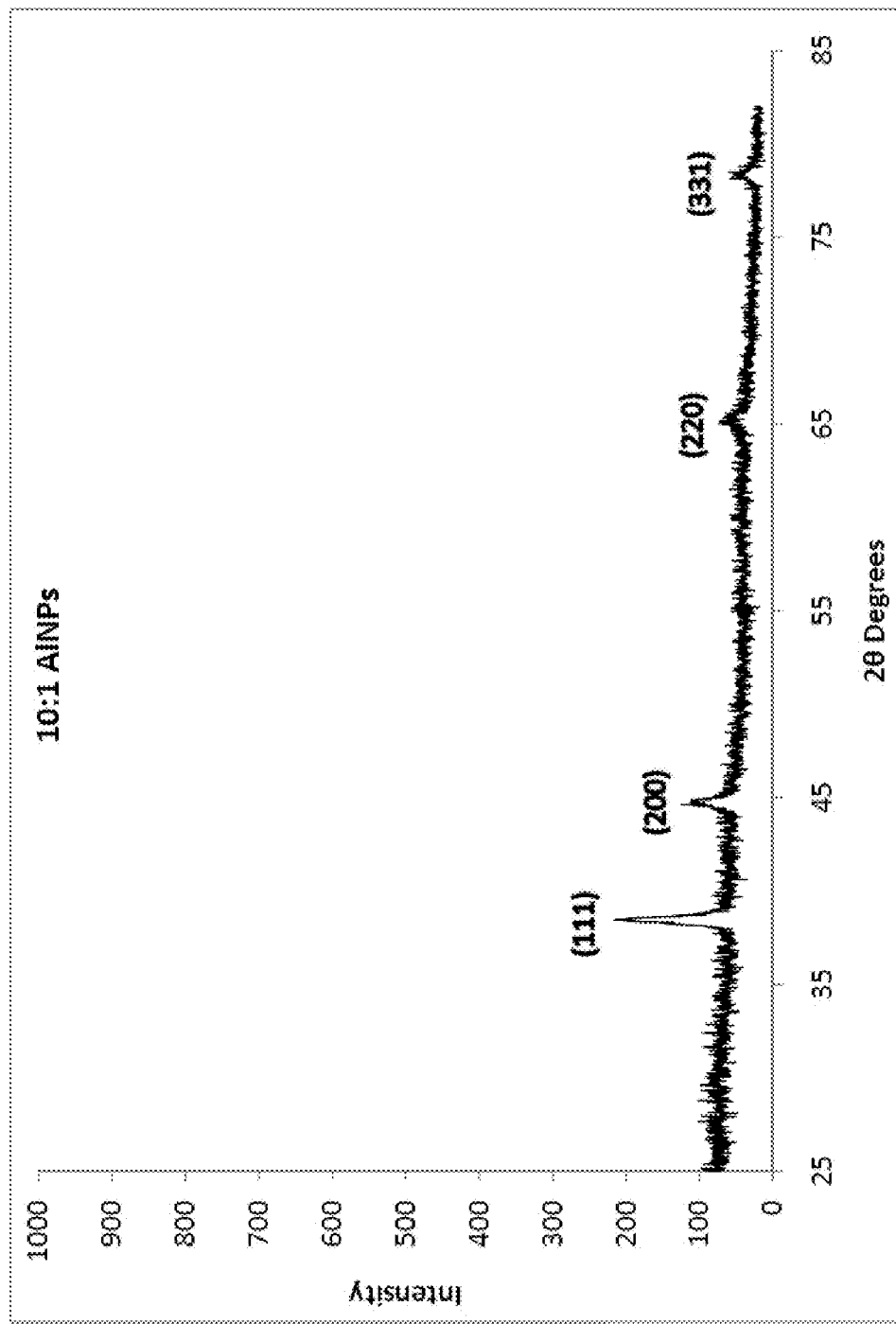
Figure 7A:
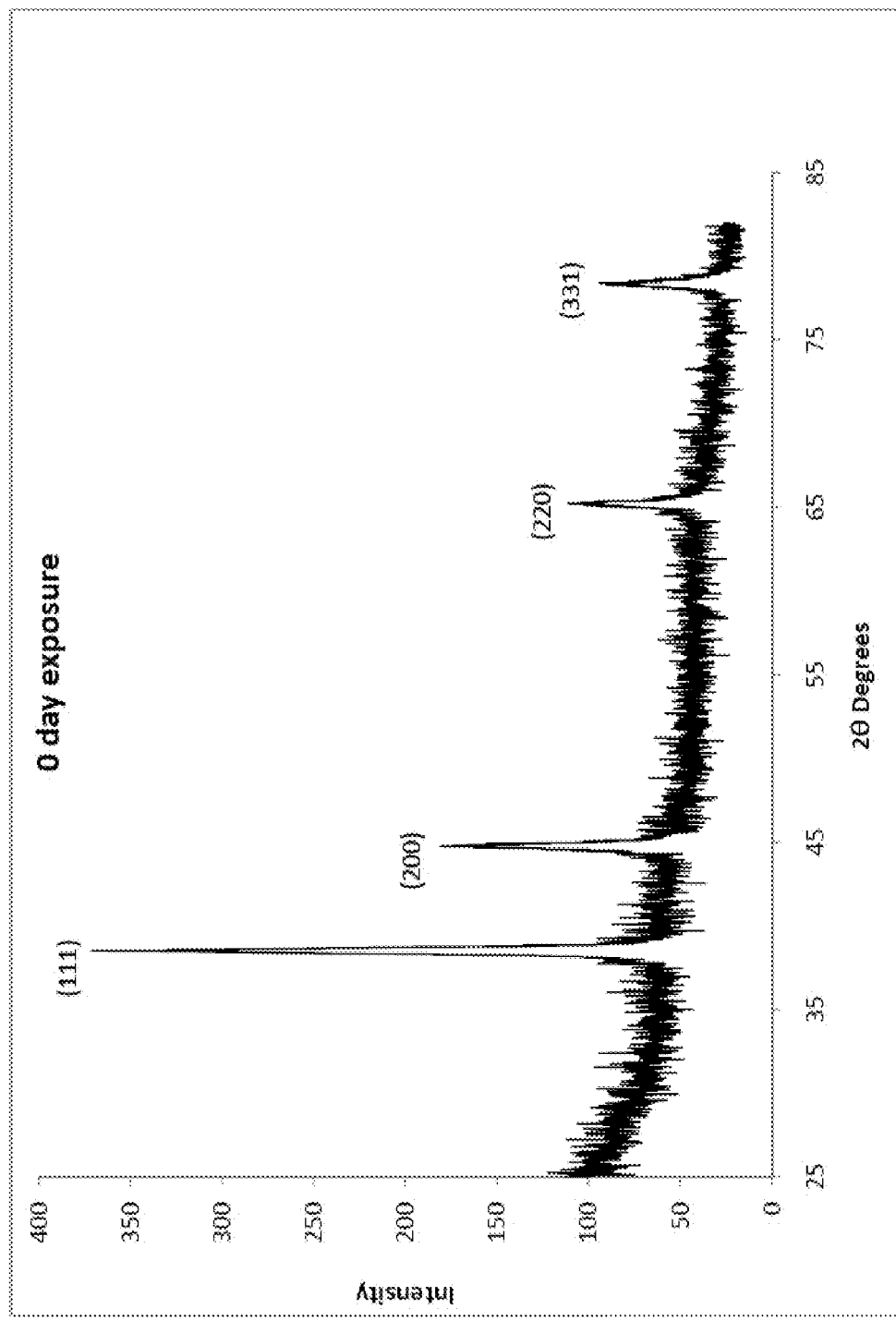
FIGS. 7a-c. Aging study for AlNPs capped with 2:1 Al:epoxydecene. PXRD was used to get idea of stability of these particles. An initial scan was performed, and the sample was left on the benchtop for a 6 weeks period. Scans were run after 2.5 week and 6 week exposure. After 6 weeks, fcc aluminum was still present in this 2:1 sample FIG. 8. Scanning transmission electron microscope (STEM) image of AlNPs capped with 10:1 Al:epoxydecene.
Figure 7B:
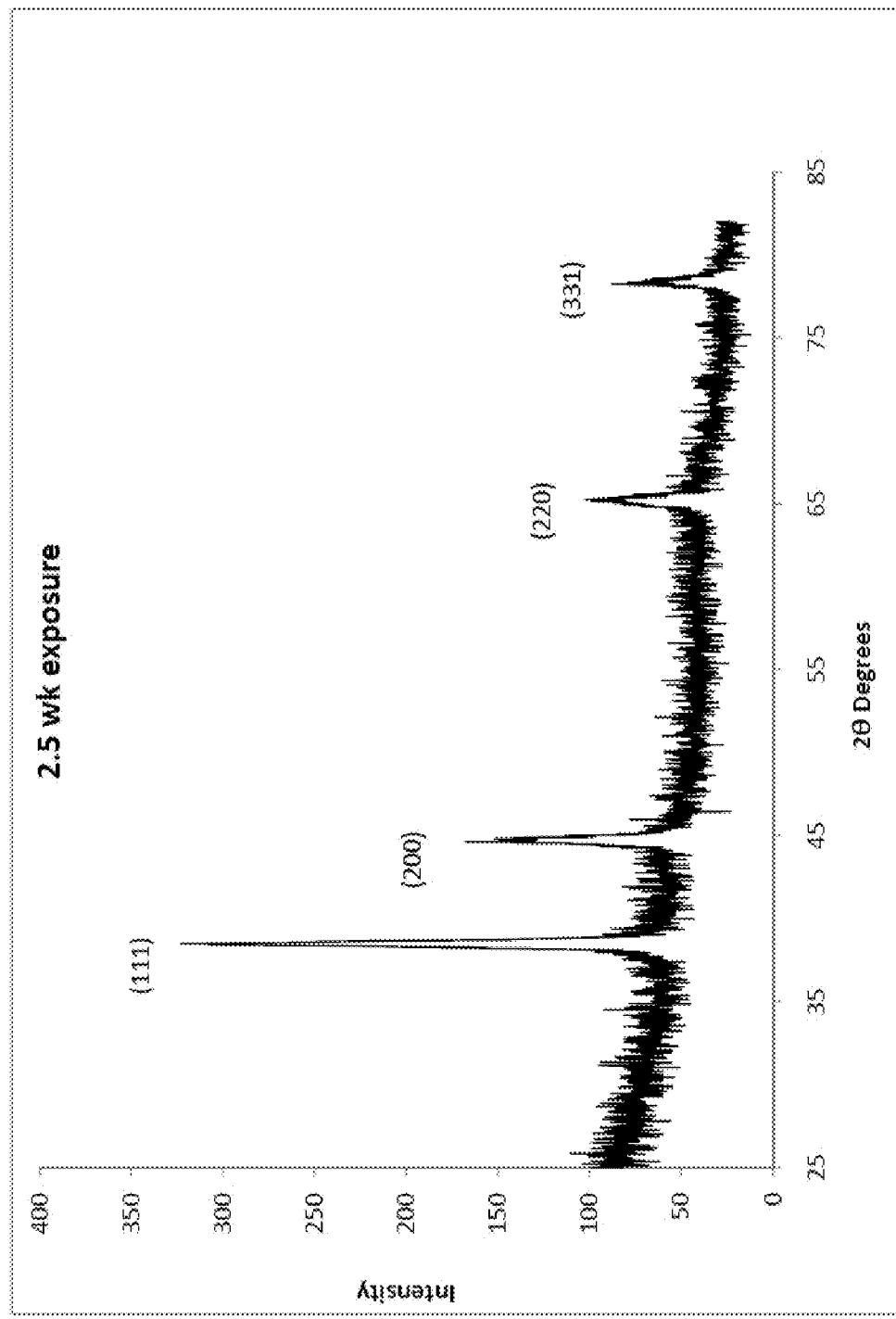
Figure 7C:
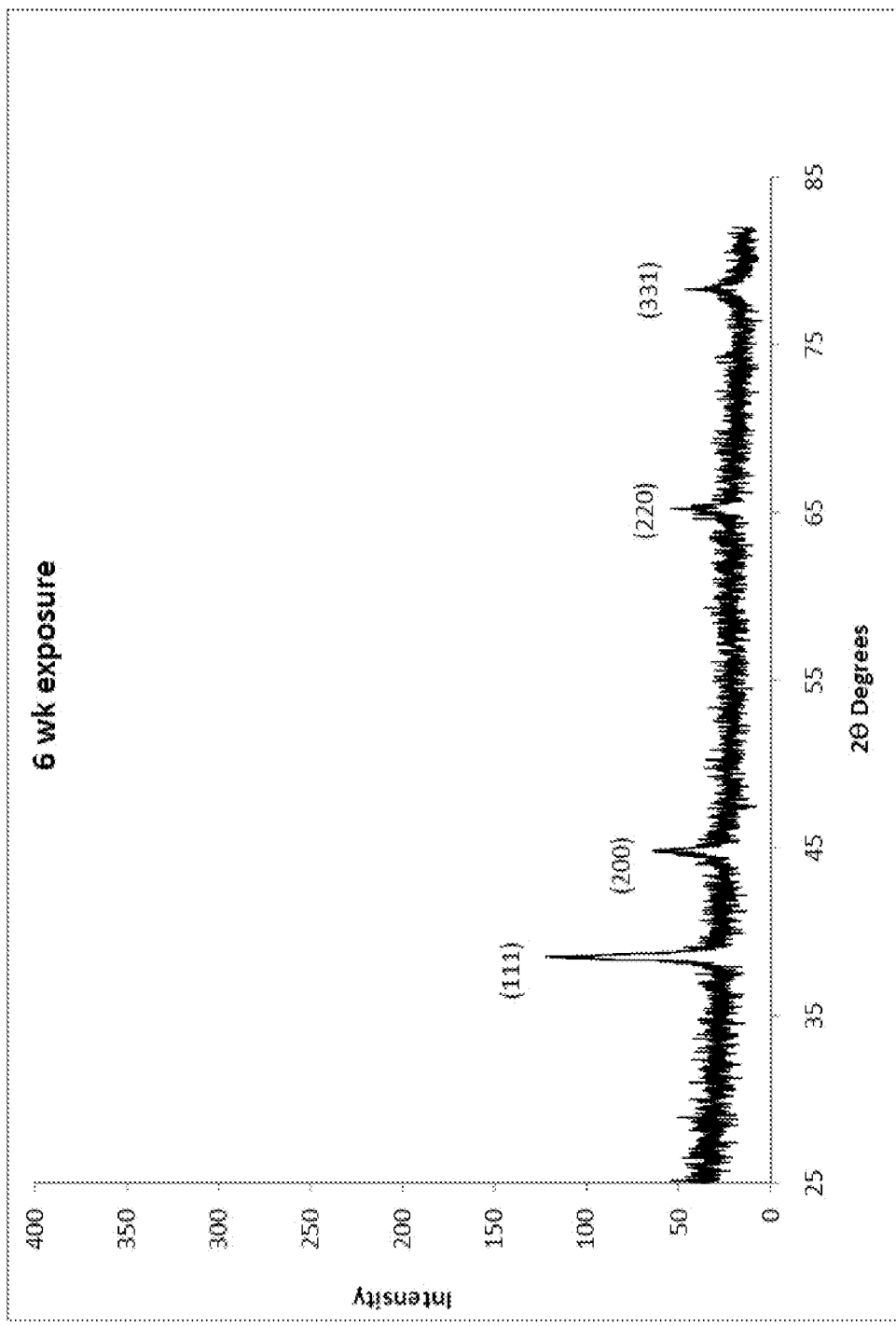

PXRD results are presented in FIGS. 6a-c for AlNPs capped with 1,2-epoxy-9-decene. According to the ICDD Crystallographic Database, the peaks located at 2Θ≈39°, 45°, 65°, & 79° correspond to face-centered cubic (fcc), metallic Al. After performing the initial scan, all samples were stored in the ambient atmosphere and PXRD scans were performed at 2.5 & 6 week intervals (FIGS. 7a-c). After 6 weeks air exposure, metallic Al peaks were still present. No visible evidence of nanoparticle degradation was observed throughout the 6 week period as all materials retained the black/dark gray color observed following the removal of solvent en vacuo.

Figure 8:

A factor that may be contributing to the long-term air stability of this material is an additional polymerization of the alkene functionality of 1,2-epoxy-9-decene. The result is a highly interconnected system in which the spherical particles (~25 nm) are embedded in a hydrophobic polymer matrix, as seen in the scanning transmission electron microscope (STEM) image (FIG. 8).

Figure 9:
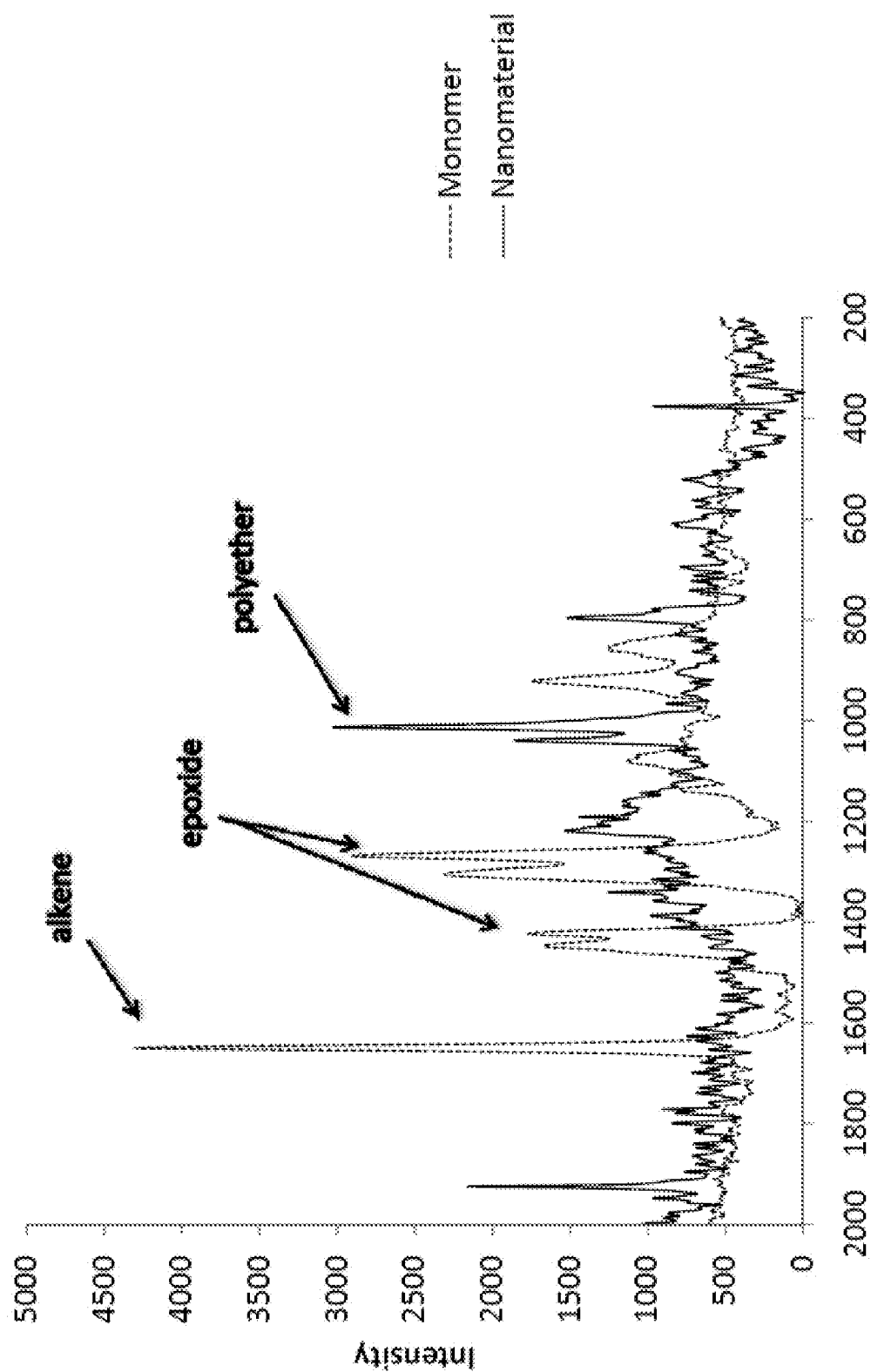
FIG. 9. Raman Spectra of 1,2-epoxy-9-decene and of AlNPs capped with 1,2-epoxy-9-decene. Raman was used to look for presence of C=C. The dashed-line spectrum is of the epoxide monomer whereas the solid-line spectrum is of the NPs. The C=C peak, which is located around 1700 wavenumbers, is not present in the AlNP spectrum. Also note the presence of epoxide & polyether, which confirms polymerization of epoxide on Al surface.
Figure 10:
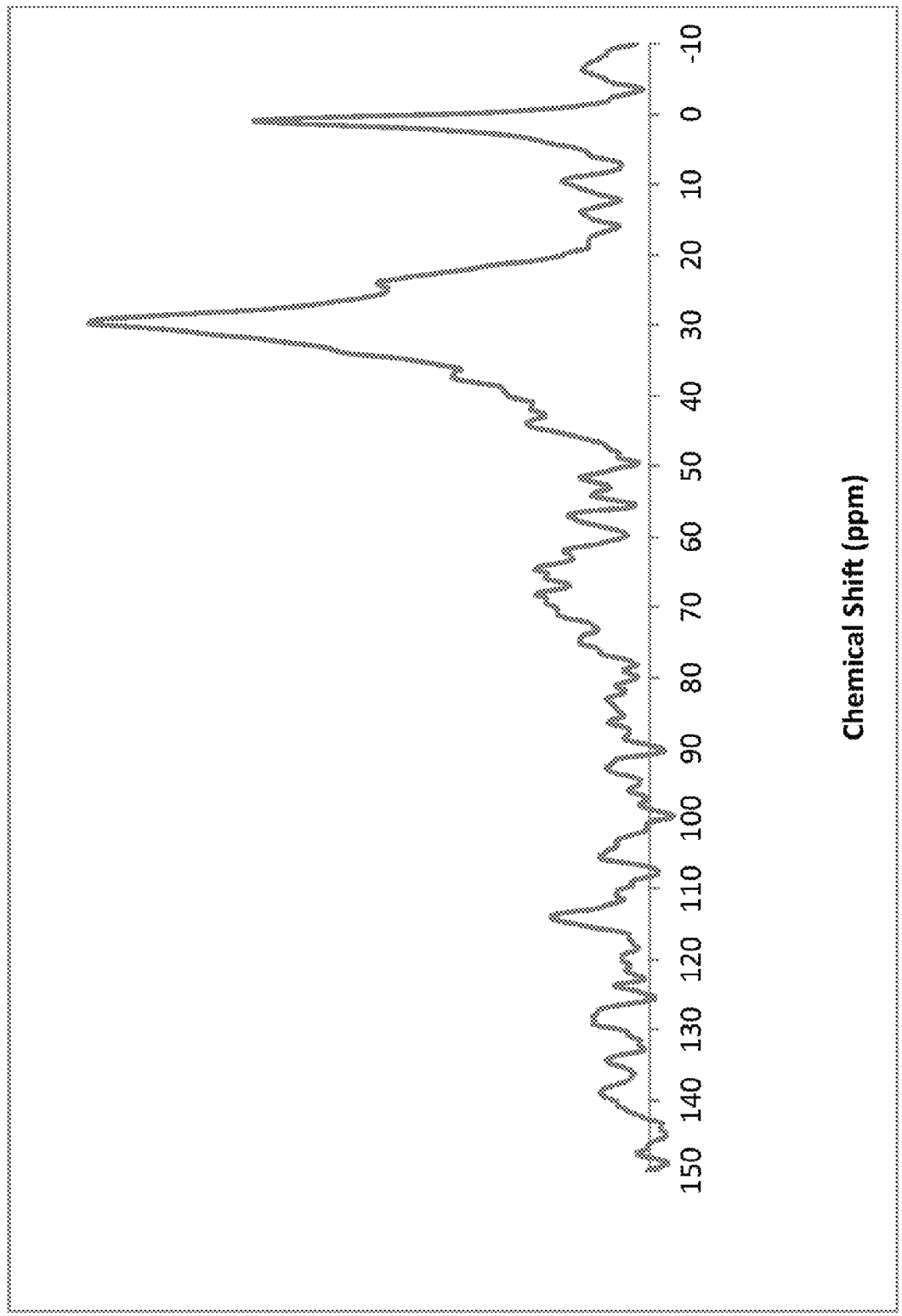
FIG. 10. Solid State $^{13}$C NMR of AlNPs capped with 10:1 Al:epoxydecene. The $^{13}$C NMR spectrum also does not show evidence of the C=C which should be present at ~100 ppm. The peaks that are present in the above mentioned spectra are attributed to the carbons of the polyether chain formed when the epoxide functionality polymerizes on the Al NP surface.

Raman Spectroscopy and $^{13}C$ Solid State NMR were utilized to characterize this polymerization process. The inventors studied the spectroscopy of the Al-polymer core-shell nanoparticles produced as discussed above. The alkene stretch in a Raman spectrum is typically located between 1640-1680 $cm^{-1}$ and is characteristic for the presence of an alkene functional group in a material. As noted in the Raman spectrum of pure 1,2-epoxy-9-decene (FIG. 9), the Raman peak is present in the starting material. In the Raman spectrum for the Al NP core-shell material, the alkene stretch is not present, indicating the absence of the C═C functional group. The absence of the C═C group is supportive of a cross-polymerization of the capping agent via this group. The $^{13}C$ NMR spectrum can also provide support for the presence or absence of the C═C functional group in a molecule. FIG. 10 presents the $^{13}C$ solid-state NMR spectrum for the Al NP core-shell material. The $^{13}C$ NMR spectrum also does not show evidence of the C═C which should be present at ~100 ppm. The peaks that are present in the above mentioned spectra are attributed to the carbons of the polyether chain formed when the epoxide functionality polymerizes on the Al NP surface.

An additional polymerization of the alkene functionality of 1,2-epoxy-9-decene with 1,13-tetradecadiene was attempted with the goal of producing an extremely hydrophobic polymer matrix to better protect and to greatly increase the air stability of the AlNPs.

Figure 11A:
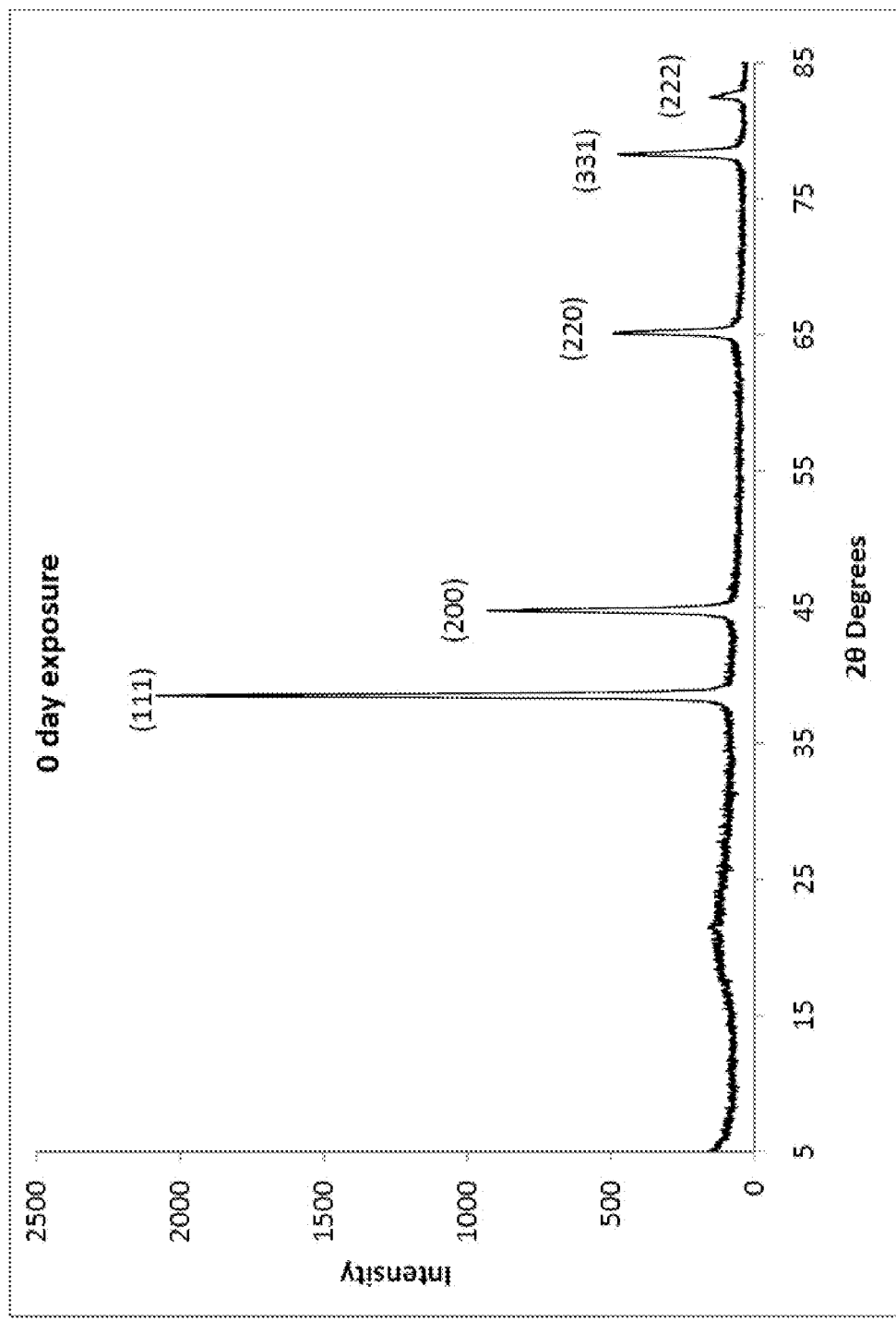
FIGS. 11a-c. Aging study for AlNPs capped with 10:1 Al:epoxydecene; 1:1 epoxydecene:tetradecadiene. A minimal loss in peak intensity after seven weeks air exposure was observed, potentially indicating more long-term air stability than what was seen for the AlNPs capped solely with 1,2-epoxy-9-decene.
Figure 11B:
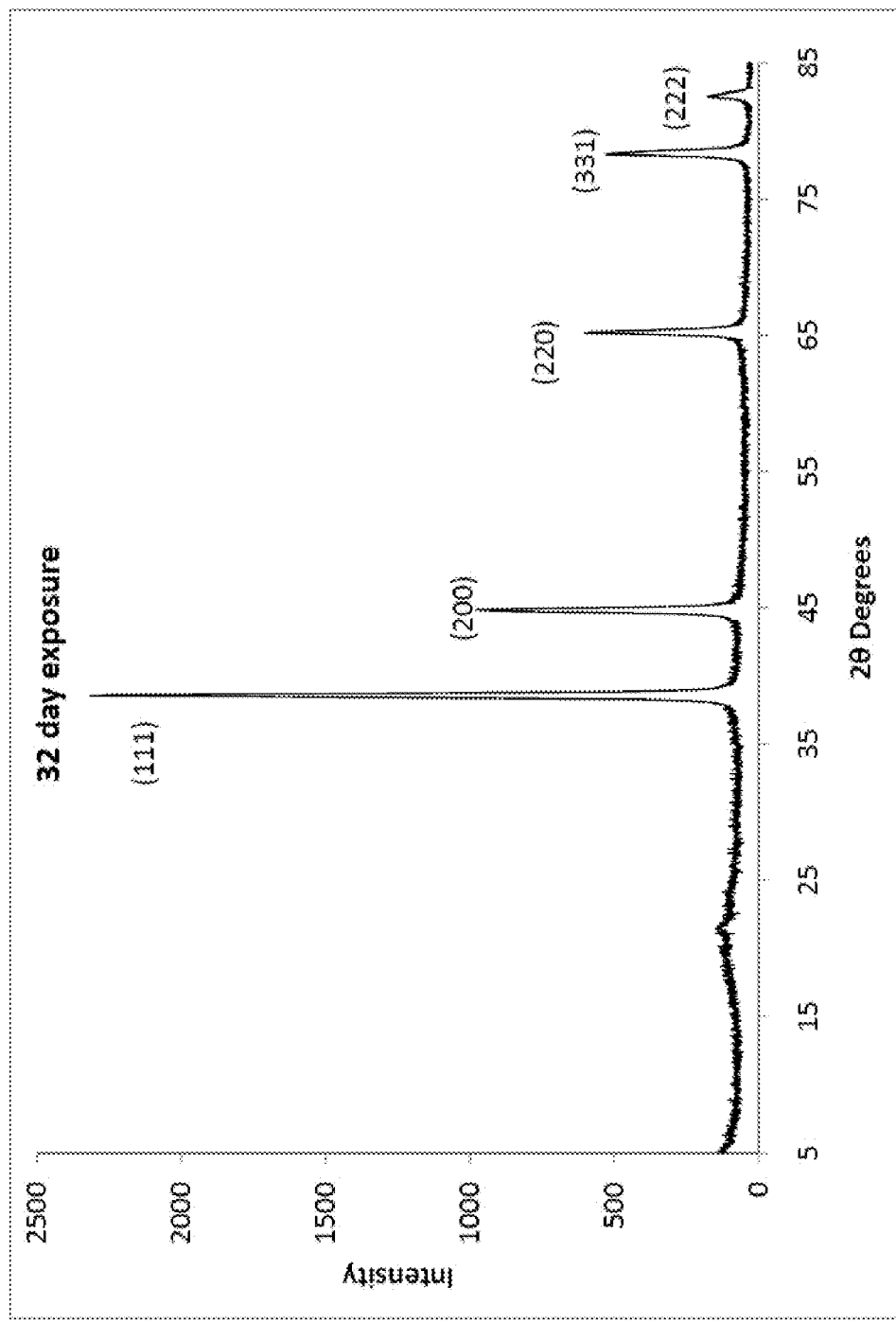
Figure 11C:
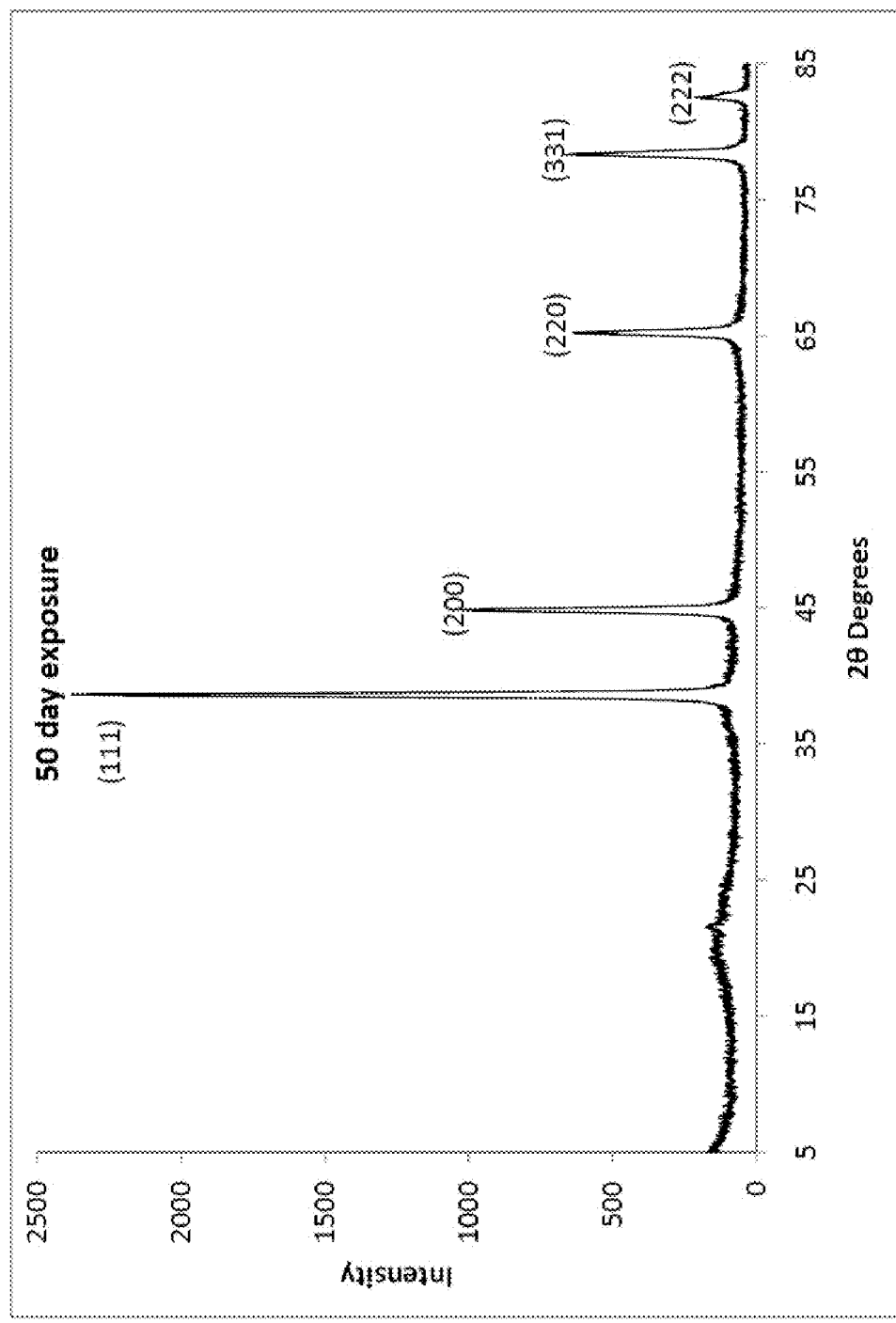

PXRD studies reveal that this copolymer system yields extremely air stable AlNPs that are ~30 nm in diameter. (Particle sizes were estimated from the Scherrer Equation that utilizes the PXRD peak widths at half the maximum intensities). A minimal loss in peak intensity after seven weeks air exposure was observed, potentially indicating more long-term air stability than what was seen for the AlNPs capped solely with 1,2-epoxy-9-decene (FIGS. 11a-c). This material is also non-reactive with water. In fact, the water evaporated after two days, leaving behind the same black material that was present upon initial water exposure.

This is an extremely long period of air stability and longer than reported anywhere for Al NPs of this diameter range.

Figure 12:
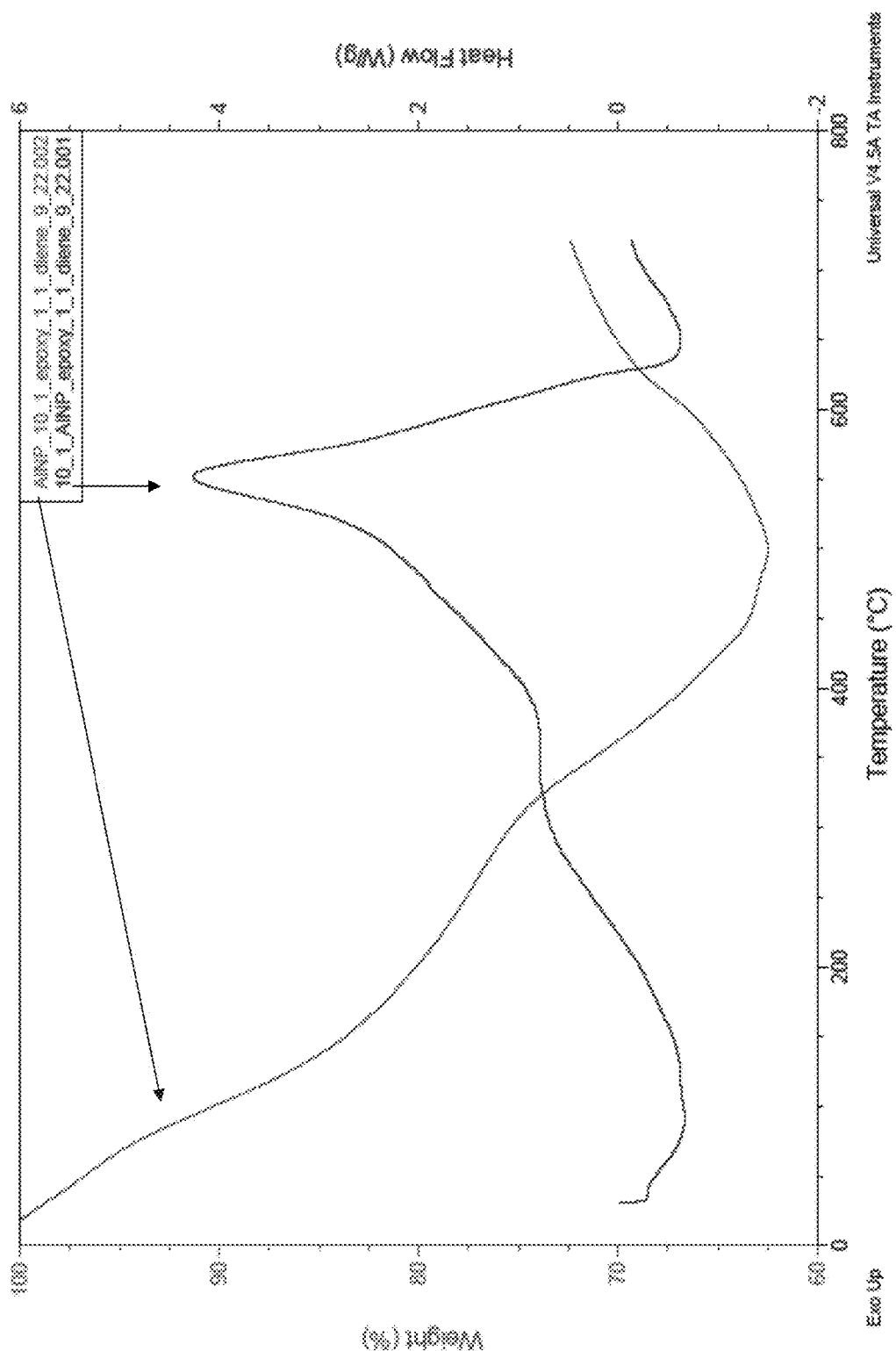
FIG. 12. DSC & TGA of AlNPs capped with epoxydecene/tetradecadiene copolymer. The DSC shows a gradual increase in heat flow between 200-400° C. corresponding to combustion of the polymer cap. This process is gradual as the nanoparticles are interconnected from the alkene polymerization. This increase in heat flow is accompanied by a mass decrease, shown in the TGA. At ~600° C., a peak is seen in the DSC which corresponds to aluminum ignition. A corresponding mass increase is seen in the TGA as a result of the formation of the heavier aluminum oxide.

Results from differential scan calorimetry (DSC) and thermogravimetric analysis (TGA) are presented FIG. 12. The DSC shows a gradual increase in heat flow between 200-400° C. corresponding to combustion of the polymer cap. This process is gradual as the nanoparticles are interconnected from the alkene polymerization. This increase in heat flow is accompanied by a mass decrease, shown in the TGA. At ~600° C., a peak is seen in the DSC which corresponds to aluminum ignition. A corresponding mass increase is seen in the TGA as a result of the formation of the heavier aluminum oxide.

Figure 13A:
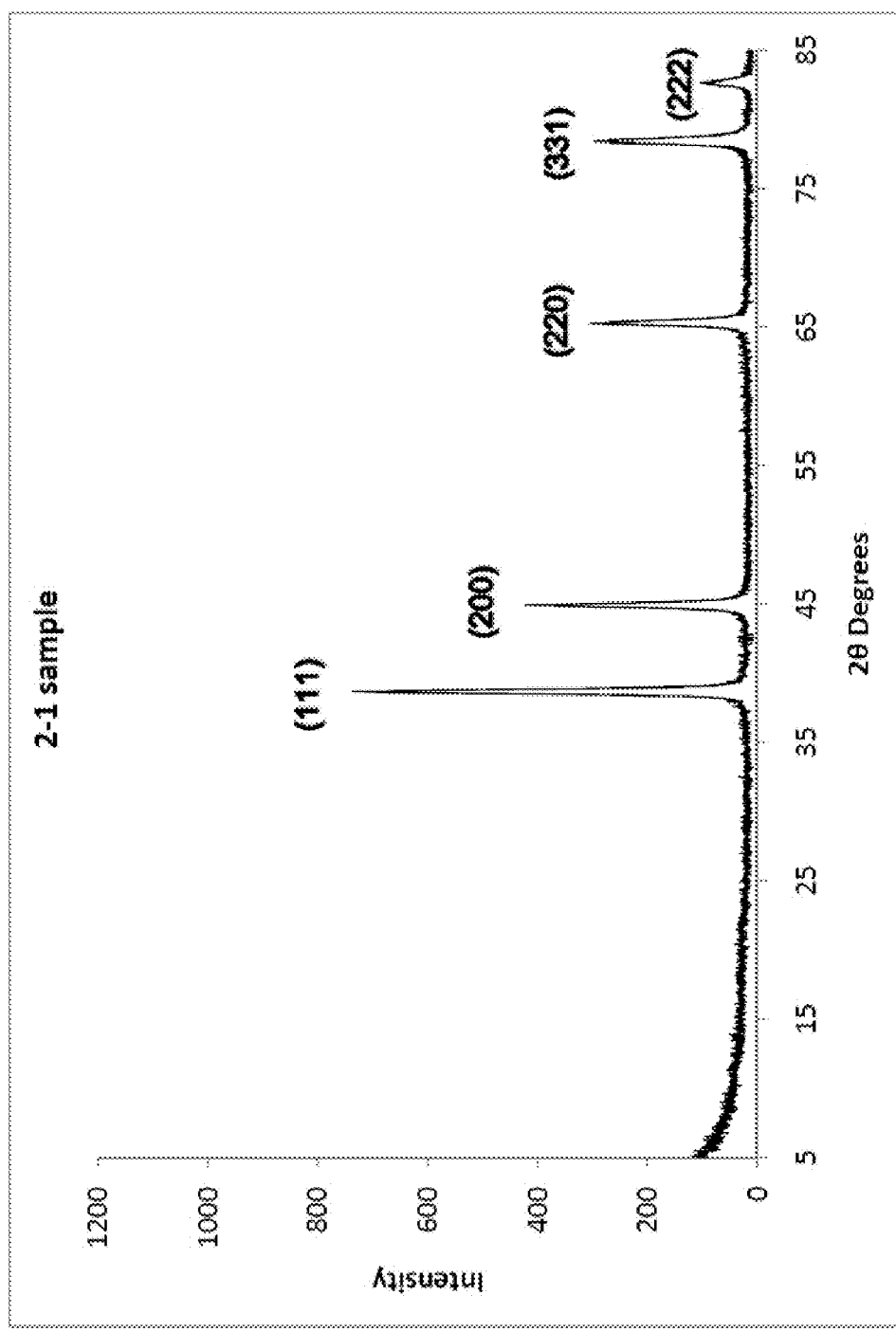
FIGS. 13a-c. PXRD of AlNPs capped with 1,13-tetradecadiene. The presence of face-centered cubic Al was confirmed with PXRD.
Figure 13B:
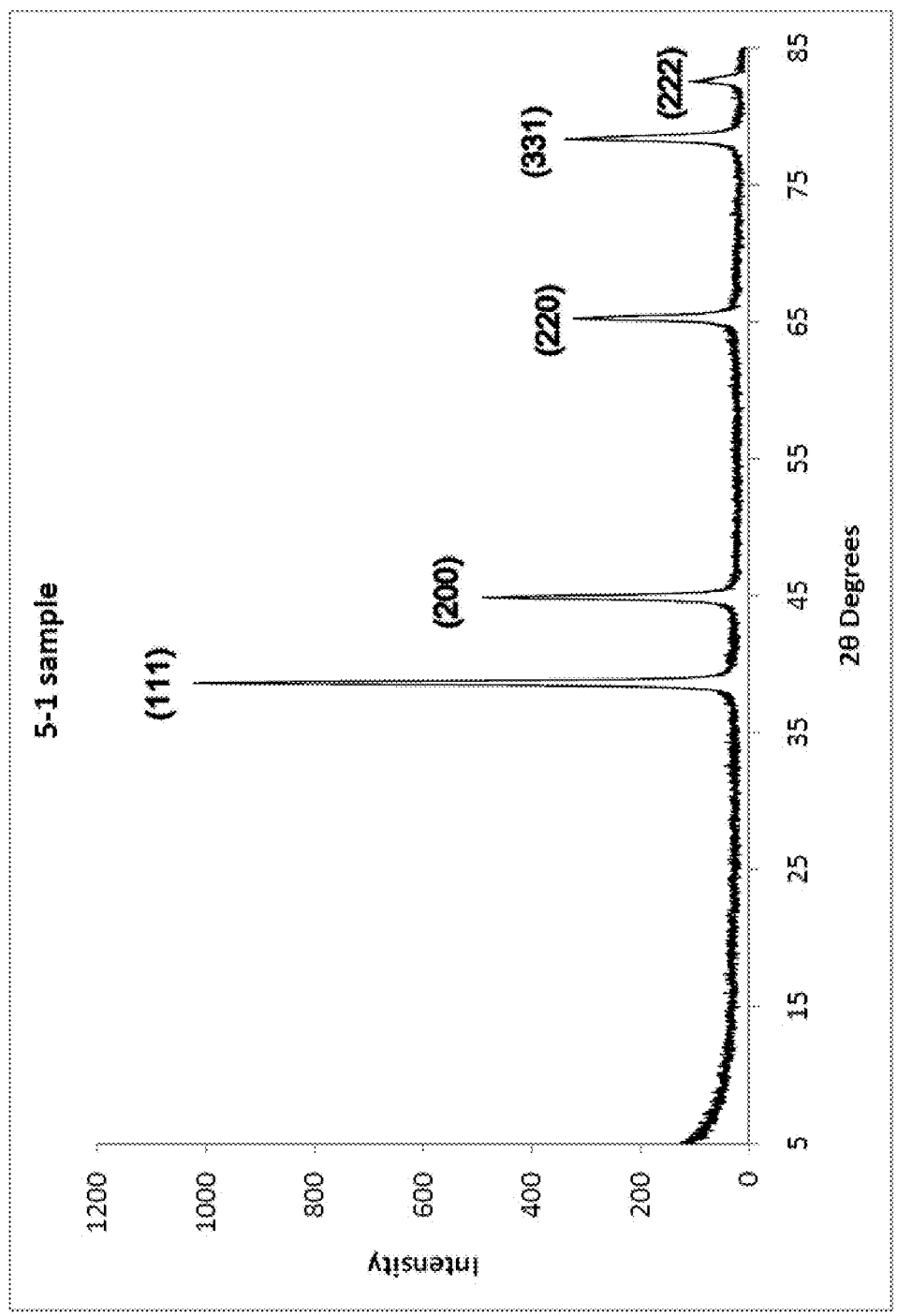
Figure 13C:
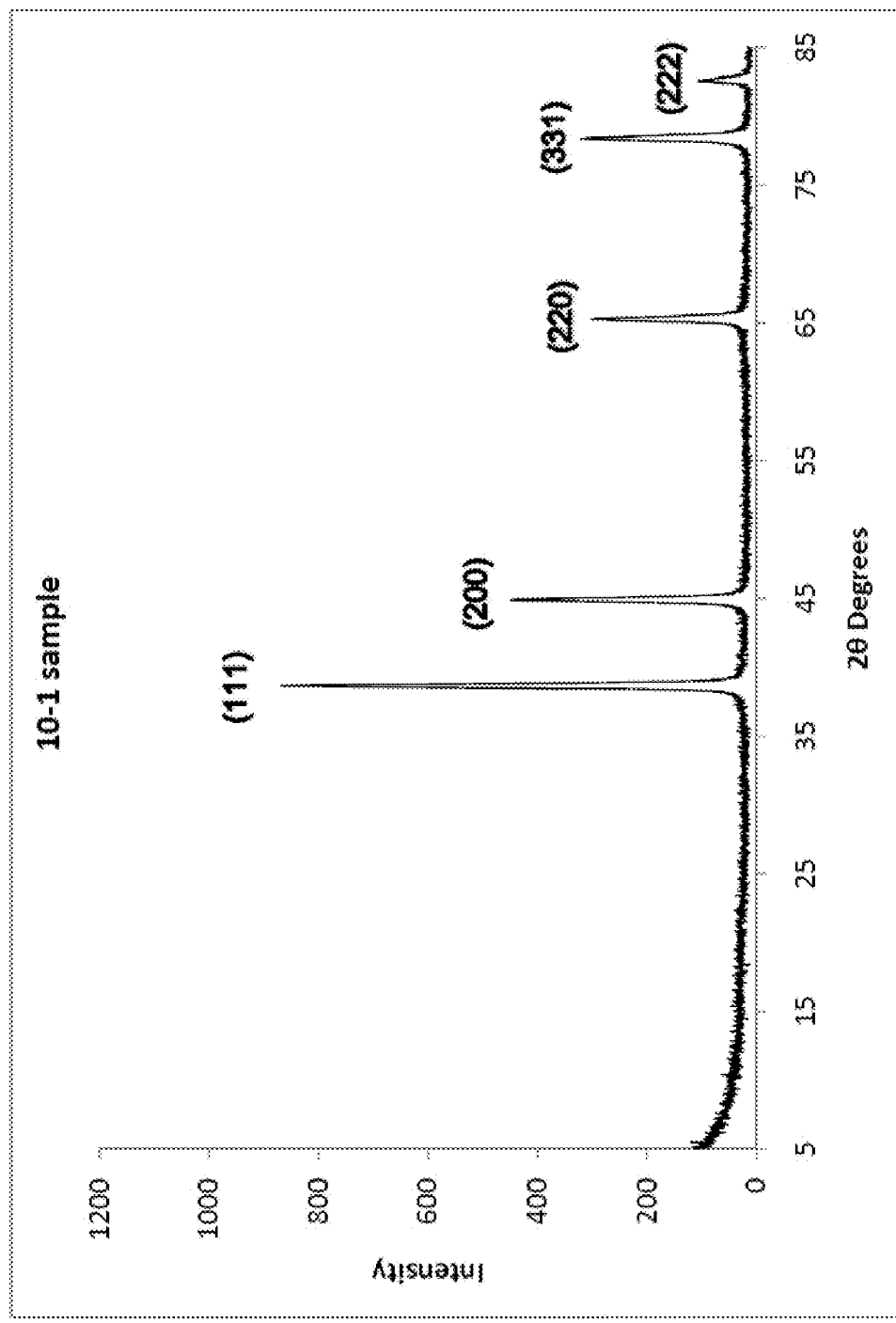
Figure 14A:
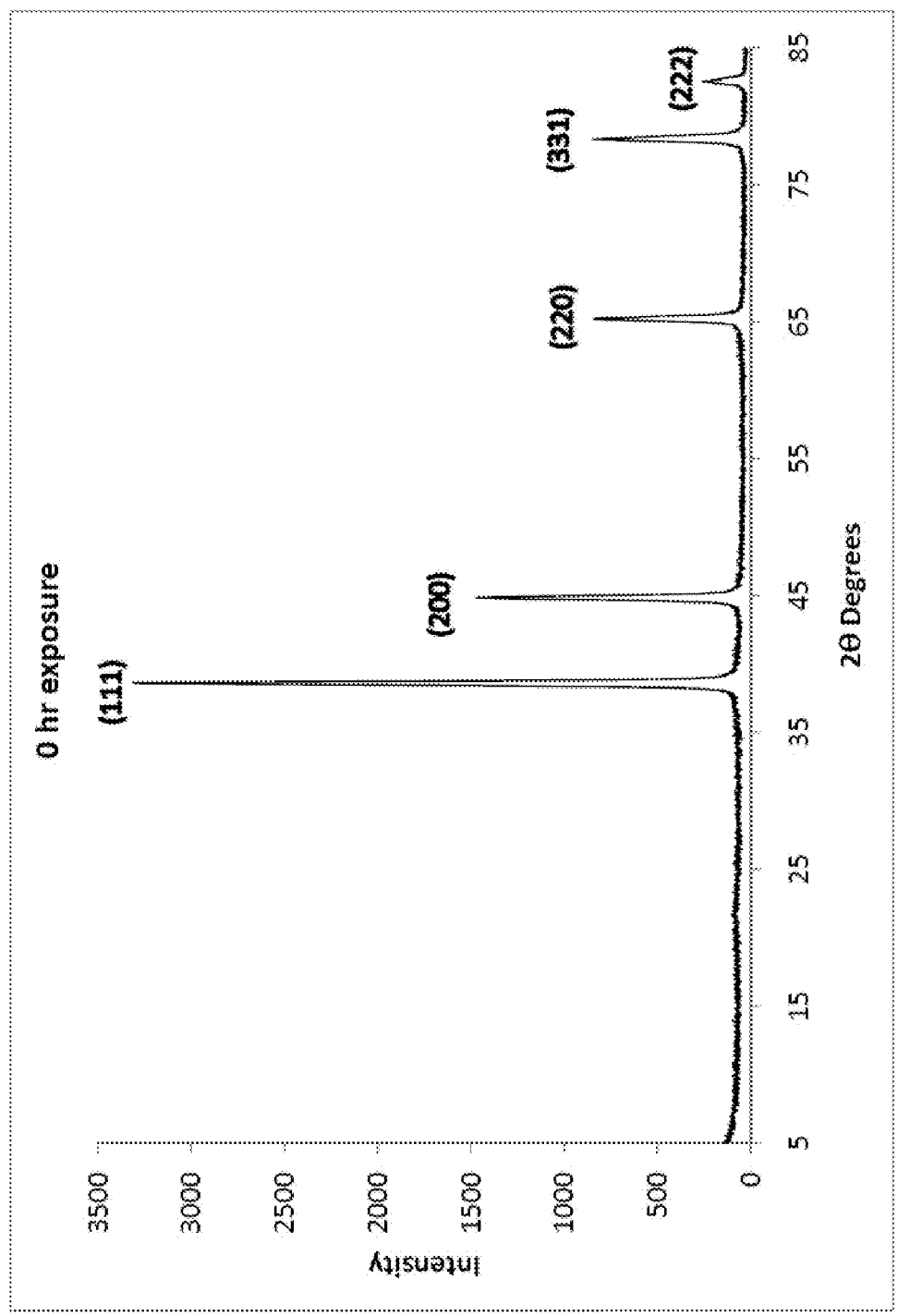
FIGS. 14a-b. Aging Study for AlNPs capped with 5:1 Al:tetradecadiene.
Figure 14B:
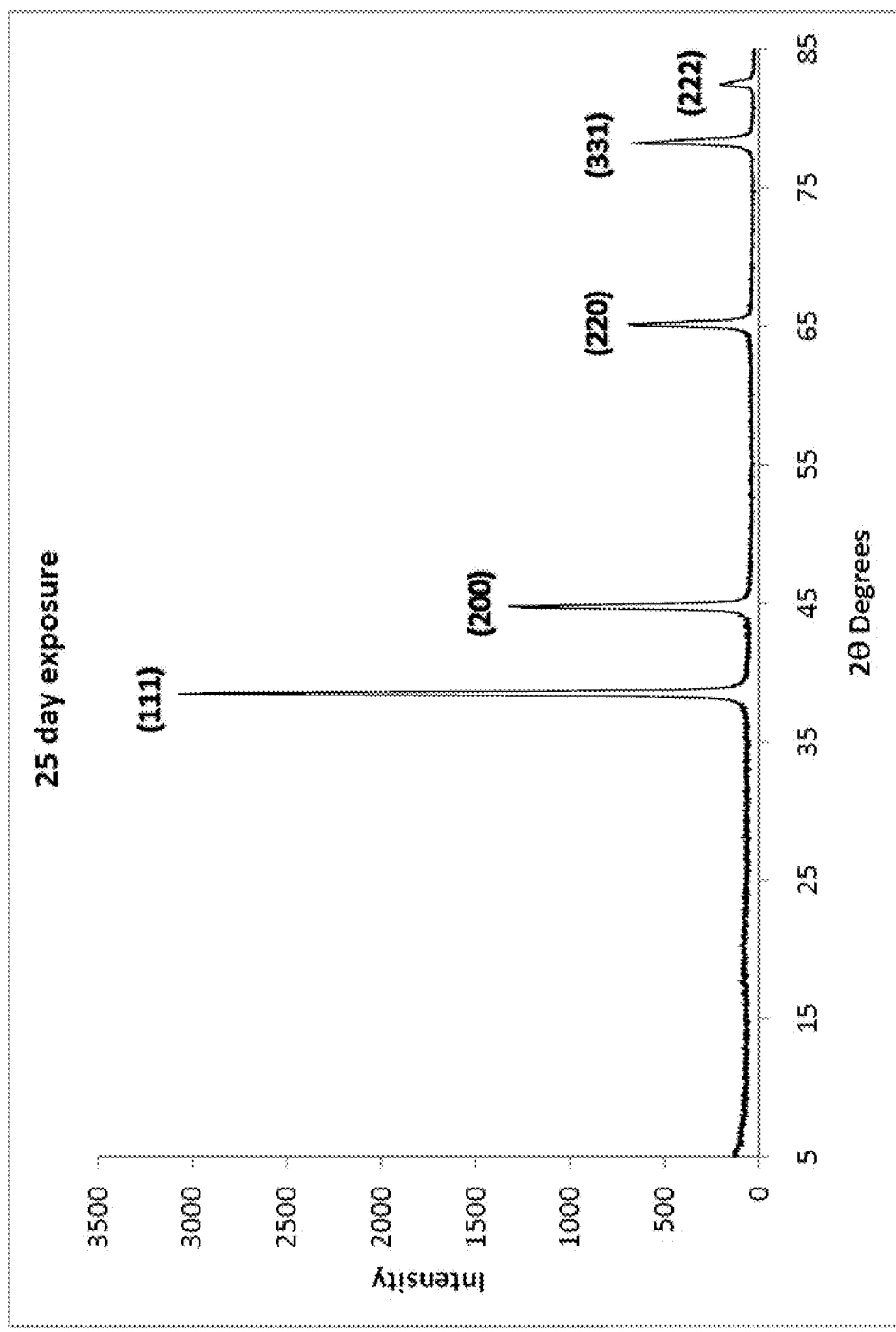
Figure 15:
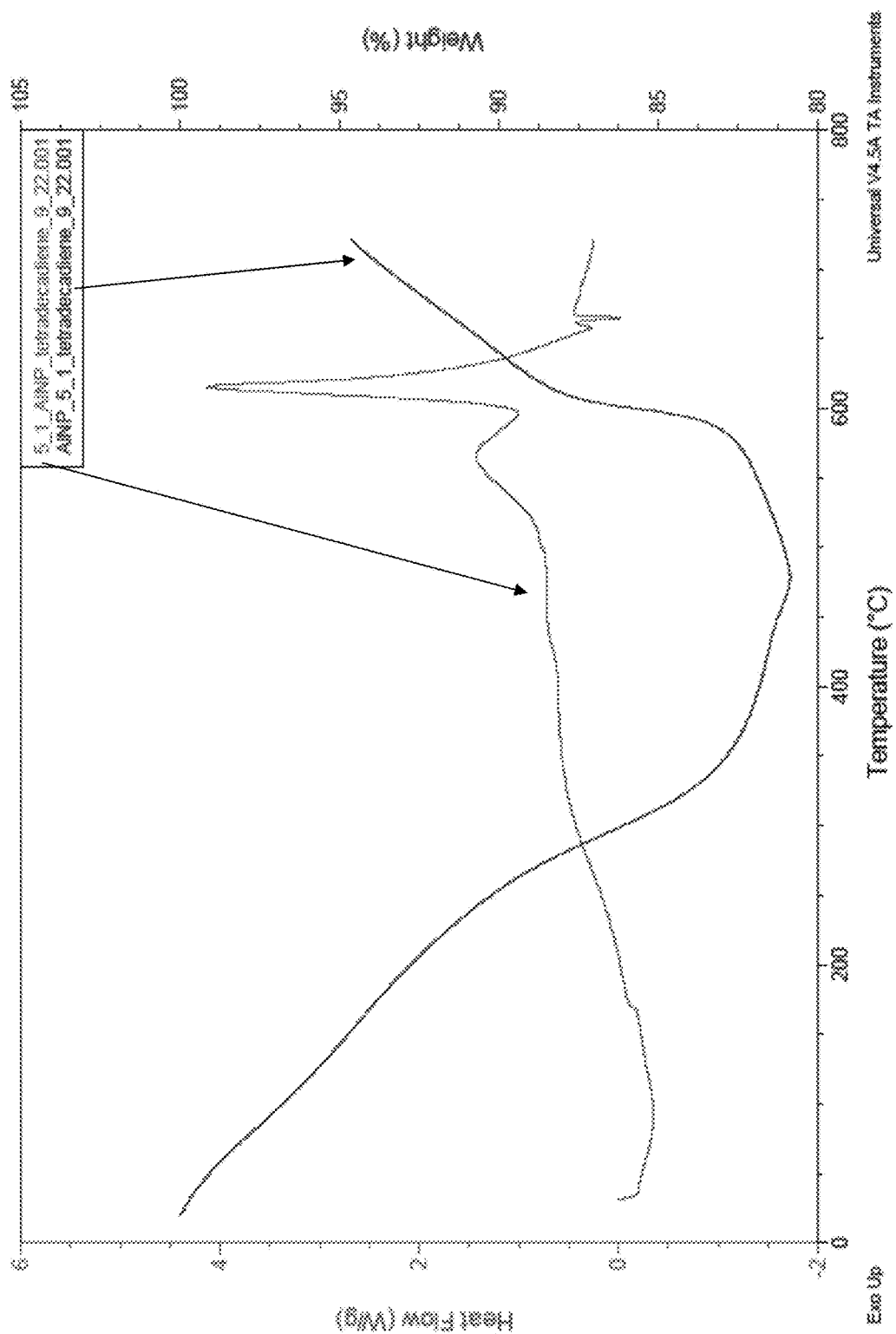
FIG. 15. DSC and TGA of AlNPs capped with 1,13-tetradecadiene, showing polymer cap combustion between 200-400° C. accompanied by a mass decrease in the TGA.

The capping of Al NPs with 1,13-tetradecadiene only (with no epoxide present) was also studied. The reaction proceeds to produce air-stable particles, indicating that the diene effectively caps the Al NP cores. The presence of face-centered cubic Al was confirmed with PXRD (FIGS. 13a-c). From Scherrer analysis, particle sizes between 20-25 nm are estimated. Initial PXRD stability experiments indicate air stability of 25 days (FIGS. 14a-b). This is a very long period relative to similar capping agents without a diene functional group, indicating polymerization of the cap to form a rigid alkane shell. DSC/TGA data (FIG. 15) shows polymer cap combustion between 200-400° C. accompanied by a mass decrease in the TGA. Aluminum ignition occurs around 600° C., which is accompanied by a mass increase in the TGA as a result of the formation of aluminum oxide.

All of the methods disclosed and claimed herein can be made and executed without undue experimentation in light of the present disclosure. While the compositions and methods of this invention have been described in terms of particular embodiments, it will be apparent to those of skill in the art that variations may be applied to the methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

The following references, and those listed in the Appendix, to the extent that they provide exemplary procedural or other details supplementary to those set forth herein, are specifically incorporated herein by reference.

U.S. Pat. No. 5,885,321
Aumann et al., *J. Vac. Sci Technol. B*, 13(3):1178-1183, 1995.
Baldé et al., *Angew. Chem. Int. Ed.*, 45:3501-3503, 2006.
Ermoline et al., *Nanotechnology*, 13:638-643, 2002.
Foley et al., *Chem. Mater.*, 17:4086-4091, 2005.
Garcia et al., *J. Appl. Polym. Sci.*, 86:1553-1557, 2002.
Glotov and Zyryanov, *Archivum combustionis*, 11(3-4):251-262, 1991.
Haber and Buhro, *J. Am. Chem. Soc.*, 120:10847-10855, 1998.
Jouet et al., *Chem. Mater.*, 17:2987-2996, 2005.
Roy et al., *Mat. Res. Soc. Symp. Proc.*, 800:79-84, 2004.
Schilling and Tonelli, *Macromolecules*, 19:1337-1343, 1986.
Tyagi et al., *Nano Lett.*, 8(5):1410-1416, 2008.
Yang et al., *J. Chem. Educ.*, 83:906, 2006.

What is claimed is:

1. A non-pyrophoric nanoparticle comprising:
   a) a core comprising metallic aluminum, wherein the core is greater than 70% by weight metallic aluminum, and less than 10% aluminum oxide; and
   b) a coating surrounding the core, wherein the coating comprises an epoxide-based oligomer comprising a repeat unit having the following structure prior to any cross-polymerization:

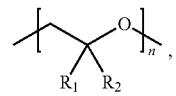

wherein:
   n is 2 to 20;
   $R_1$ is H, alkyl$_{(C\leq18)}$, alkenyl$_{(C\leq18)}$, alkynyl$_{(C\leq18)}$, acyl$_{(C\leq18)}$, aryl$_{(C\leq18)}$, aralkyl$_{(C\leq18)}$, heteroaryl$_{(C\leq18)}$, alkoxy$_{(C\leq18)}$, acyloxy$_{(C\leq18)}$, alkylamino$_{(C\leq18)}$, dialkylamino$_{(C\leq18)}$, amido$_{(C\leq18)}$ or a substituted version thereof; and
   $R_2$ is alkenyl$_{(C\leq18)}$,
and wherein the molar ratio of the aluminum to a monomer of the epoxide-based oligomer is from about 0.5:1 to about 10:1.

2. The non-pyrophoric nanoparticle of claim 1, wherein $R_1$ is H.

3. The non-pyrophoric nanoparticle of claim 1, wherein $R_2$ is octa-7-en-1-yl.

4. The non-pyrophoric nanoparticle according to claim 1, wherein the $R_2$ groups of one or more of the oligomers have been cross-polymerized to one another.

5. The non-pyrophoric nanoparticle of claim 4, wherein the cross-polymerization comprises an olefin polymerization reaction of the carbon-carbon double bonds of the $R_2$ groups.

6. The non-pyrophoric nanoparticle of 4, wherein the cross polymerization further comprises a co-polymerization of the double bonds of the $R_2$ groups with the double bonds of an alkadiene$_{(C4-30)}$.

7. The non-pyrophoric nanoparticle of claim 6, wherein the alkadiene$_{(C4-30)}$ is 1,13 tetradecadiene.

8. The non-pyrophoric nanoparticle of claim 1, wherein the molar ratio of the aluminum to the monomer of the epoxide-based oligomer is from about 1:1 to about 5:1.

9. The non-pyrophoric nanoparticle of claim 8, wherein the molar ratio of the aluminum to the monomer of the epoxide-based oligomer is about 1:1.

10. The non-pyrophoric nanoparticle of claim 8, wherein the molar ratio of the aluminum to the monomer of the epoxide-based oligomer is about 2:1.

11. The non-pyrophoric nanoparticle of claim 8, wherein the molar ratio of the aluminum to the monomer of the epoxide-based oligomer is about 5:1.

12. The non-pyrophoric nanoparticle of claim 1, wherein the core is greater than 80% by weight aluminum.

13. The non-pyrophoric nanoparticle of claim 12, wherein the core is greater than 90% by weight aluminum.

14. The non-pyrophoric nanoparticle of claim 13, wherein the core is greater than 95% by weight aluminum.

15. The non-pyrophoric nanoparticle of claim 1, wherein the core is less than 5% by weight aluminum oxide.

16. The non-pyrophoric nanoparticle according to claim 1, wherein the nanoparticle has an average diameter from about 10 nm to about 500 nm.

17. The non-pyrophoric nanoparticle of claim 16, wherein the nanoparticle has an average diameter from about 10 nm to about 300 nm.

18. The non-pyrophoric nanoparticle of claim 17, wherein the nanoparticle has an average diameter from about 10 to about 150 nm.

19. The non-pyrophoric nanoparticle of claim 17, wherein the nanoparticle has an average diameter from about 10 to about 40 nm.

20. The non-pyrophoric nanoparticle of claim 19, wherein the nanoparticle has an average diameter of about 19 nm.

21. The non-pyrophoric nanoparticle of claim 19, wherein the nanoparticle has an average diameter of about 25 nm.

22. The non-pyrophoric nanoparticle of claim 17, wherein the nanoparticle has a diameter of about 100 nm.

23. A method for the preparation of a non-pyrophoric nanoparticle, comprising reacting an alane-amine complex with titanium isopropoxide and an epoxide monomer to form the non-pyrophoric nanoparticle.

24. The method of claim 23, wherein the alane amine complex is N,N-dimethylethylamine alane.

25. The method of claim 23, wherein the alane amine complex is dissolved in a first solvent prior to the reacting of the alane-amine complex with titanium isopropoxide and the epoxide monomer.

26. The method of claim 25, wherein the first solvent comprises toluene.

27. The method of claim 25, wherein the first solvent comprises diethyl ether.

28. The method of claim 23, wherein the titanium isopropoxide is dissolved in a second solvent prior to the reacting of the alane-amine complex with titanium isopropoxide and the epoxide monomer.

29. The method of claim 28, wherein the second solvent comprises toluene.

30. The method of claim 23, wherein the reacting of the alane-amine complex with titanium isopropoxide and the epoxide monomer occurs at approximately 300K and over approximately from about 10 to about 60 minutes.

31. The method of claim 23, wherein the reacting of the alane-amine complex with titanium isopropoxide and the epoxide monomer occurs at from about 300K to about 450K.

32. The method of claim 23, further comprising removing the solvent after the reacting of the alane-amine complex with titanium isopropoxide and the epoxide monomer.

33. The method of claim 23, further comprising cross-polymerizing two or more $R_1$ or $R_2$ groups so that one oligomer chain is covalently attached with $R_1$ or $R_2$ of another oligomer chain's $R_1$ or $R_2$ group.

* * * * *